United States Patent
Yamazaki et al.

(10) Patent No.: US 9,264,605 B2
(45) Date of Patent: Feb. 16, 2016

(54) FOCUS ADJUSTMENT UNIT AND FOCUS ADJUSTMENT METHOD

(71) Applicant: Olympus Corporation, Shibuya-ku, Tokyo (JP)

(72) Inventors: Yukie Yamazaki, Hino (JP); Kazumasa Kunugi, Hachioji (JP); Yoshinobu Omata, Hachioji (JP); Tetsuo Kikuchi, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 14/489,626

(22) Filed: Sep. 18, 2014

(65) Prior Publication Data

US 2015/0092101 A1    Apr. 2, 2015

(30) Foreign Application Priority Data

Sep. 27, 2013   (JP) .................. 2013-201568

(51) Int. Cl.
*H04N 5/232* (2006.01)
*G02B 7/28* (2006.01)

(52) U.S. Cl.
CPC ............ *H04N 5/23212* (2013.01); *G02B 7/282* (2013.01)

(58) Field of Classification Search
CPC ..................... H04N 5/23212; G02B 7/282
See application file for complete search history.

(56) References Cited

U.S. PATENT DOCUMENTS

| | | | | |
|---|---|---|---|---|
| 2012/0033127 A1* | 2/2012 | Uenishi | ............. | H04N 5/23293 348/345 |
| 2012/0281131 A1* | 11/2012 | Isobe | ................... | G02B 7/343 348/345 |
| 2014/0300802 A1* | 10/2014 | Hamano | ........... | H04N 5/23212 348/354 |
| 2014/0340564 A1* | 11/2014 | Isobe | ................... | G02B 7/343 348/345 |

* cited by examiner

*Primary Examiner* — Nicholas Giles
(74) *Attorney, Agent, or Firm* — John C. Pokotylo; Straub & Pokotylo

(57) ABSTRACT

A focus adjustment unit of the present invention comprises a phase difference detection section for detecting extreme values, based on the image data, a periodicity-containing subject determination section for determining a periodicity-containing subject in the case where the phase difference detection section detects many extreme values having a high degree of correlation, and a control section for, when a periodicity-containing subject has been determined, determining whether or not a difference between a position of the focus lens shown by an extreme value corresponding to a position that is closest to a current focus lens position, and the current focus lens position, is outside a specified range, and if it is determined that the difference is outside the specified range, carrying out a focus adjustment operation based on the extreme value corresponding to the position that is closest to the current position of the focus lens.

20 Claims, 19 Drawing Sheets

FIG. 3

FOCUS ADJUSTMENT UNIT AND FOCUS ADJUSTMENT METHOD

Benefit is claimed, under 35 U.S.C. §119, to the filing date of prior Japanese Patent Application No. 2013-201568 filed on Sep. 27, 2013. This application is expressly incorporated herein by reference. The scope of the present invention is not limited to any requirements of the specific embodiments described in the application.

BACKGROUND OF THE INVENTION

1. Field of the Invention

The present invention relates to a focus adjustment unit and a focus adjustment method, and in more detail relates to a focus adjustment unit, having a photographing lens including a focus lens, with image data being formed by receiving light of a pupil divided subject image by means of this photographing lens, for carrying out focus adjustment based on this image data, and to a focus adjustment method.

2. Description of the Related Art

A phase difference AF focus adjustment unit that carries out correlation calculation using image data that has been created by receiving light of a pupil divided subject image by means of a photographing lens, obtains a phase difference and drives to a focus, is known. With this phase difference AF method, in a case where there is a periodic pattern in the subject image a plurality of focus candidate points will be calculated, and as a result it is difficult to obtain a true focus target position.

To such an end, in Japanese Patent laid-open No. 2011-150179 (hereafter referred to as Patent literature 1), contrast evaluation values for a current position and close to that position are acquired, a focus direction is determined from a relationship between these contrast evaluation values, a contrast evaluation value for a current lens position and a contrast evaluation value for a nearby position after defocus drive by a specified amount from that position, are acquired, and focus direction is determined from these contrast evaluation values.

SUMMARY OF THE INVENTION

An object of the present invention is to provide a focus adjustment unit and a focus adjustment method that can detect a true focus position using minimal lens drive, even in a case where a periodicity-containing subject has been detected, to enable a high speed AF system.

A focus adjustment device of the present invention has a photographing lens that includes a focus lens, with image data being generated by receiving light of a pupil divided subject image by means of the photographing lens and subjecting the received light to photoelectric conversion, and the focus adjustment unit carrying out a focus adjustment operation based on this image data, and comprises a phase difference detection section for detecting extreme values having a high degree of correlation, based on the image data, a periodicity-containing subject determination section for determining a periodicity-containing subject in the case where the phase difference detection section detects many extreme values having a high degree of correlation, and a control section for, when a periodicity-containing subject has been determined, determining whether or not a difference between a position of the focus lens shown by an extreme value corresponding to a position that is closest to a current focus lens position, among extreme values having a high degree of correlation, and the current focus lens position, is outside a specified range, and if it is determined that the difference is outside the specified range, carrying out a focus adjustment operation based on the extreme value corresponding to the position that is closest to the current position of the focus lens.

A focus adjustment method of the present invention, for a focus adjustment unit that has a photographing lens including a focus lens, with image data being generated by receiving light of a pupil divided subject image by means of the photographing lens and subjecting the received light to photoelectric conversion, and the focus adjustment unit carrying out a focus adjustment operation based on this image data, comprises detecting extreme values having a high degree of correlation, based on the image data, determining a periodicity-containing subject in the case where many extreme values having a high degree of correlation have been detected, and when a periodicity-containing subject has been determined, determining whether or not a difference between a position of the focus lens shown by an extreme value corresponding to a position that is closest to a current focus lens position, among extreme values having a high degree of correlation, and the current focus lens position, is outside a specified range, and if it is determined that the difference is outside the specified range, carrying out a focus adjustment operation based on the extreme value corresponding to the position that is closest to the current position of the focus lens.

BRIEF DESCRIPTION OF THE DRAWINGS

FIG. 3 is a drawing showing an arrangement of pixels, made up of phase difference AF detection pixels and imaging pixels, of an image sensor of the camera of one embodiment of the present invention.

DETAILED DESCRIPTION OF THE PREFERRED EMBODIMENTS

Figure 1:
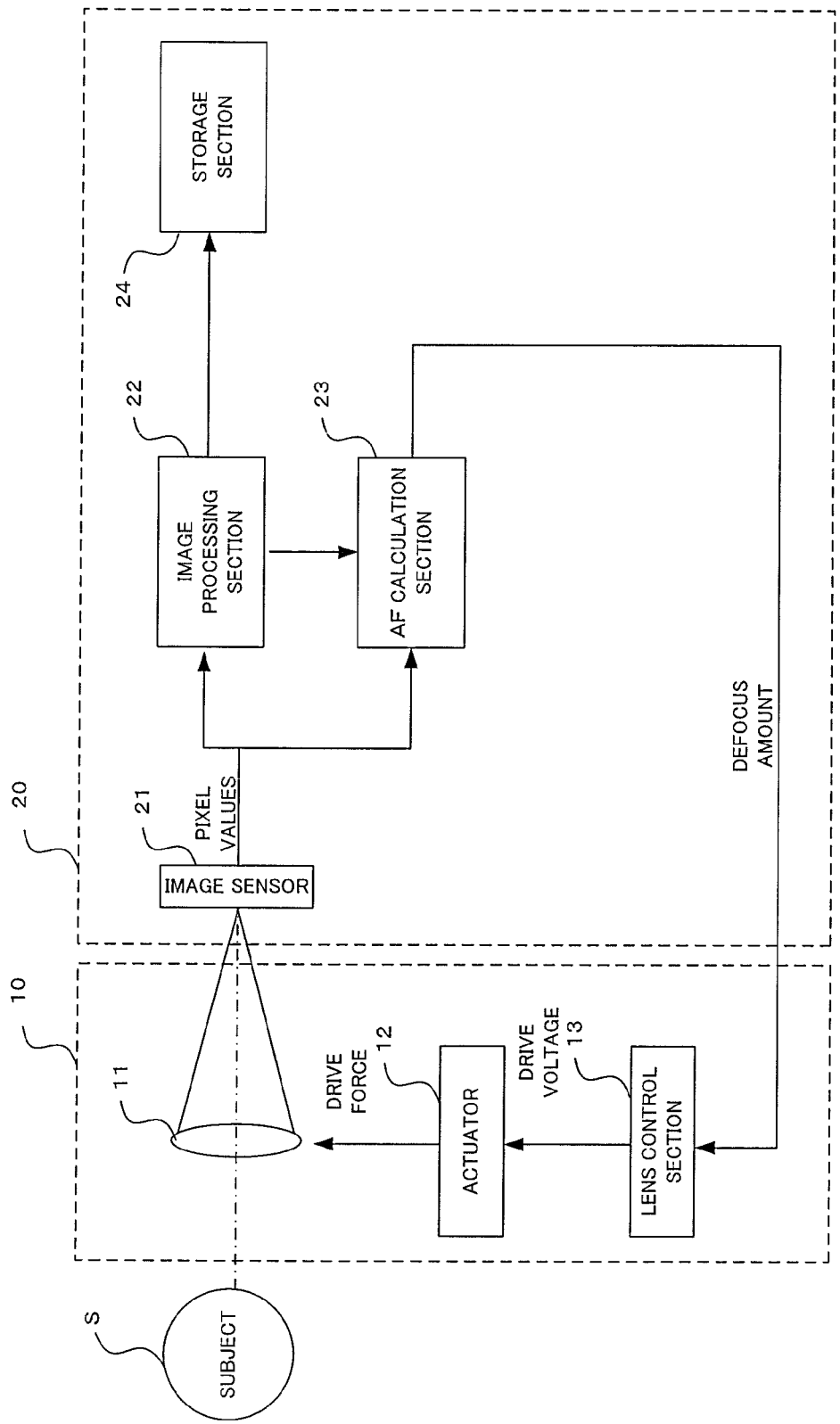
FIG. 1 is a block diagram mainly showing the electrical structure of a camera of one embodiment of the present invention.

Preferred embodiments using a digital camera (hereafter abbreviated to "camera") to which the present invention has been applied will be described in the following in accordance with the drawings. FIG. 1 is a block diagram mainly showing the electrical structure of a camera of one embodiment of the present invention. The camera relating to this embodiment comprises an interchangeable lens barrel 10 and a camera body 20. With this embodiment, the interchangeable lens barrel 10 and a camera body 20 are configured separately, but they may also be constructed integrally, like a general compact camera.

A photographing lens 11 is arranged inside the interchangeable lens barrel 10. The photographing lens 11 includes a focus lens, constituted by a plurality of optical lenses for forming an optical image of a subject S. An actuator 12 and a lens control section 13 are also arranged inside the interchangeable lens barrel 10. The lens control section 13 receives defocus amount (including defocus direction, and the same applies in the following) from an AF calculation section 23 inside the camera body 20, and carries out control of the actuator 12 based on these items of information. The actuator 12 moves the focus lens inside the photographing lens 11 in the optical axis direction to carry out focusing. Position of the focus lens is detected by a lens position detection section (not shown), and transmitted to the camera body 20 via a communication section (not shown).

An image sensor 21, image processing section 22, AF calculation section 23, and storage section 24 are provided within the camera body 20. The image sensor 21 is arranged on the optical axis of the photographing lens 11, close to a position where a subject image is formed. The image sensor 21 is provided with a plurality of pixels that have a photoelectric conversion section for converting the subject image (optical image) to an electrical signal. The plurality of pixels include phase difference AF detection pixels configured so as to restrict incident direction of light flux incident on the pixels (also called focus detection pixels), and imaging pixels configured so as not to restrict light flux that is incident on the pixels as much as the phase difference AF detection pixels, with the plurality of pixels being arranged two-dimensionally. Arrangement of the phase difference AF detection pixels and the imaging pixels of the image sensor 21 will be described later using FIG. 3 and FIG. 4.

The image sensor 21 outputs pixel values that have been output from the phase difference AF detection pixels and the imaging pixels to the image processing section 22 and the AF calculation section 23. The image processing section 22 is input with pixel values from the imaging pixels, among the pixel values, and carries out image processing for a live view display image and a storage image. The image processing section 22 outputs image data that has been processed for storage to the storage section 24. The storage section 24 is an electrically rewritable non-volatile memory, to which image data for storage is input and stored. Also, the image processing section 22 detects a face of the subject using pixel values and outputs a central coordinate position of this face, and detects an organ such as an eye within a face and outputs a specific coordinate position of this organ. Also, the image processing section 22 carries out subject tracking using pixel values.

The AF calculation section 23 is input with pixel values from the phase difference AF detection pixels, among the pixel values, and carries out AF calculation based on phase difference AF. At the time of AF calculation, a ranging area corresponding to positions of the phase difference AF detection pixels is set based on the central coordinate position and specific coordinate positions that were acquired from the image processing section 22, and defocus amount and contrast evaluation value are calculated for this set ranging area. The focus lens within the photographing lens 11 is driven to a focus position based on the calculated defocus amount and contrast evaluation value. Also, the AF calculation section 23 carries out selection of an extreme value of correlation value for calculating the defocus amount so that it is possible to drive to a true focus position in the case of a subject that has periodicity.

Figure 2:
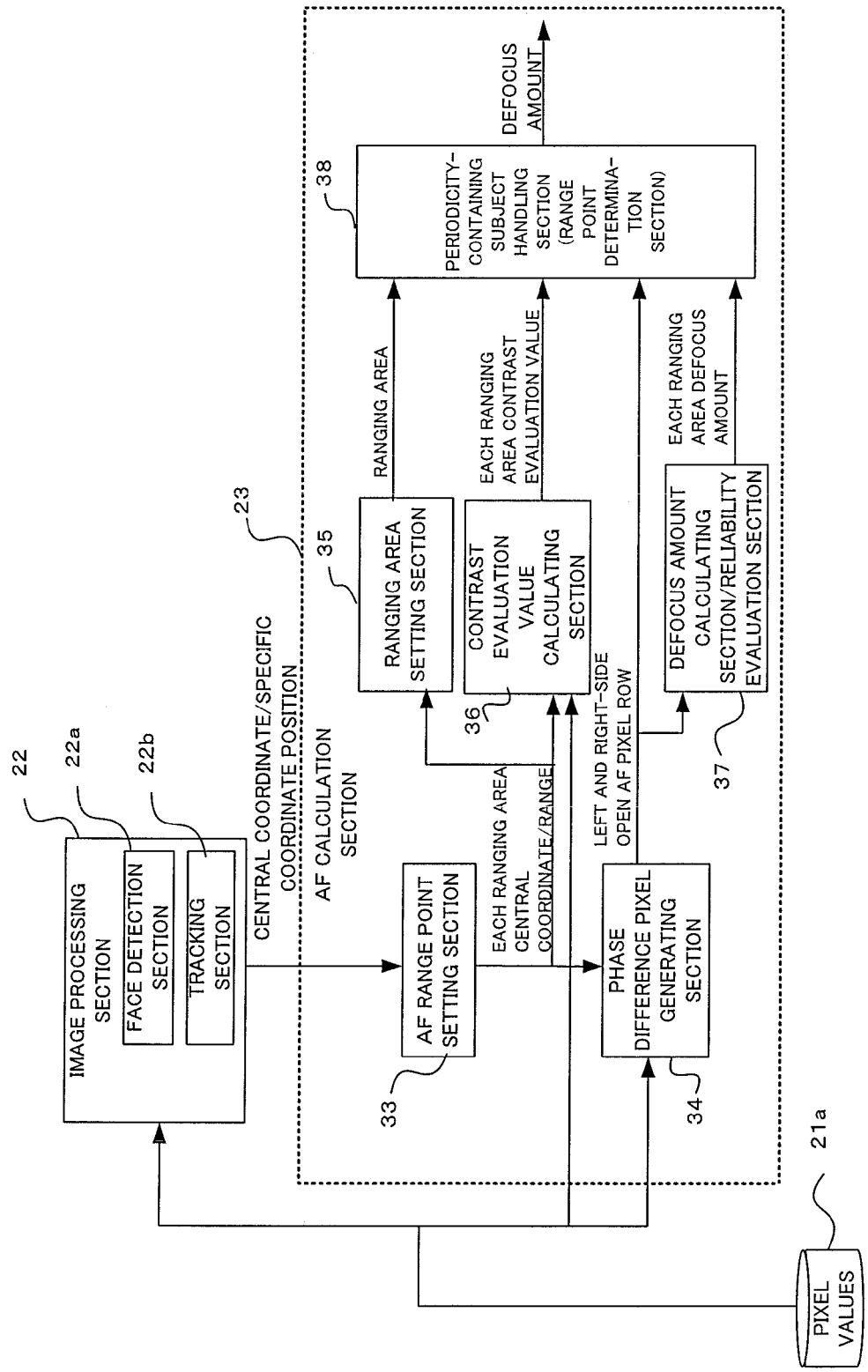
FIG. 2 is a block diagram showing the detail of an AF calculation section of a camera of one embodiment of the present invention.

Next, details of the AF calculation section 23 will be described using FIG. 2. A pixel value 21a is a pixel value that has been output from the image sensor 21, and is temporary stored in SDRAM (not shown) or the like.

A face detection section 22a is also provided within the image processing section 22. This face detection section 22a determines whether or not there is a face within the subject image based on pixel values of the imaging pixels from the image sensor 21, and in the case that a face is present, detects the position (central coordinate position) and size etc. of that face. Detection of organs such as the left eye, right eye and nose etc. is also carried out, and a specific coordinate position of that organ is also detected. The central coordinate and specific coordinate position that have been detected by the face detection section 22a are output to an AF range point setting section 33 within the AF calculation section 23.

A tracking section 22b is provided within the image processing section 22. This tracking section 22b carries out tracking of a subject based on pixel values of the imaging pixels from the image sensor 21. For example, by comparing pixel values for position of a face that has been detected by the face detection section 22a and position of the subject that has been designated by the photographer (subject of tracking) every time pixel values are output from the image sensor 21, where the same subject (subject of tracking) has moved to is detected, and in this way tracking is performed. The central coordinate and specific coordinate position for the object of tracking that have been detected by the tracking section 22b are output to the AF range point setting section 33 within the AF calculation section 23.

Based on the central coordinate position or the specific coordinate position that have been detected by the face detection section 22a or the tracking section 22b, the AF range point setting section 33 sets a ranging point corresponding to this position. The image sensor 21 is divided into a plurality of ranging areas, with a ranging point that is close to the central coordinate position or the specific coordinate position being set from within this plurality of ranging areas, and central coordinates of each ranging point that has been set being output to a ranging area setting section 35 and a contrast evaluation value calculation section 36.

A phase difference pixel generating section 34 is input with image data of phase difference AF detection pixels, among the pixel value 21a, generates pixel rows for phase difference AF detection, and outputs to a defocus amount calculating section/reliability evaluation section 37 and a periodicity-containing subject handling section 38 (also called ranging point determination section).

The defocus amount calculating section/reliability evaluation section 37 is input with image data of the pixel rows for phase difference AF detection, calculates a defocus amount using a phase difference AF method, and outputs a defocus amount for each ranging area to the periodicity-containing subject handling section 38. The defocus amount calculating section/reliability evaluation section 37 functions as a phase difference detection section for detecting extreme values having a high degree of correlation based on image data. Calculation of defocus amount using phase difference AF and determination of reliability will be described later using FIG. 5 to FIG. 7.

The ranging area setting section 35 is input with central coordinates of each ranging area from the AF range point setting section 33, sets a ranging area, and outputs to the periodicity-containing subject handling section 38. With this embodiment, a plurality of ranging areas are provided, and the position of each ranging area is fixed in advance. The most appropriate ranging area is set based on information such as central area and size of main subject (for example, a face) etc. from the AF range point setting section 33. However, depending on the central area and the size of the main subject etc., there may be cases where the main subject straddles a plurality of ranging areas, and in this case a plurality of ranging areas are set.

The contrast evaluation value calculation section 36 is input with pixel values from imaging pixels from the pixel values 21a, and is input with central coordinates of each ranging area from the AF range point setting section 33. Using this information calculation of contrast evaluation value is carried out, and a contrast evaluation value for each ranging area is output to the periodicity-containing subject handling section 38. Since this contrast evaluation value is calculated using pixel values from the imaging pixels, calculation time becomes longer but it is possible to obtain contrast values of higher accuracy. The contrast evaluation value calculation section 36 functions as a contrast evaluation value detection section for detecting contrast evaluation values based on image data.

As was described previously, the periodicity-containing subject handling section 38 is input with ranging areas, contrast evaluation value of each ranging area, defocus amount for each ranging area, and left-side open and right-side open AF pixel rows, and calculates defocus amount for the ranging areas that have been set so that an appropriate focus point can be obtained even for a subject having periodicity. The periodicity-containing subject handling section 38 functions as a periodicity-containing subject determination section for determining a periodicity-containing subject in the case where the phase difference detection section detects many extreme values having a high degree of correlation. The periodicity-containing subject handling of this embodiment will be described later using FIG. 8 to FIG. 18.

Figure 3:
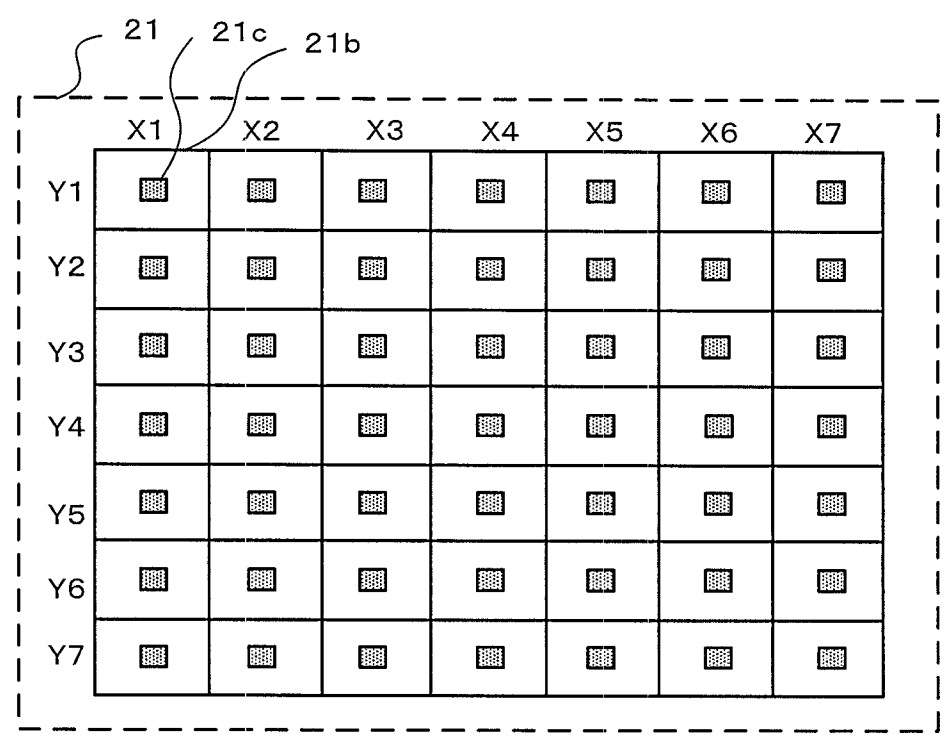

Next, the image sensor 21 and the ranging areas will be described using FIG. 3 and FIG. 4. With the example shown in FIG. 3, the image sensor 21 is divided in a row direction X1-X7 and in a line direction Y1-Y7, and these 49 areas each constitute a ranging area. The area shown by reference numeral 21b is represented by (X1,Y1). A central point 21c of each ranging area of each area is made the central coordinate of a ranging area.

Figure 4:
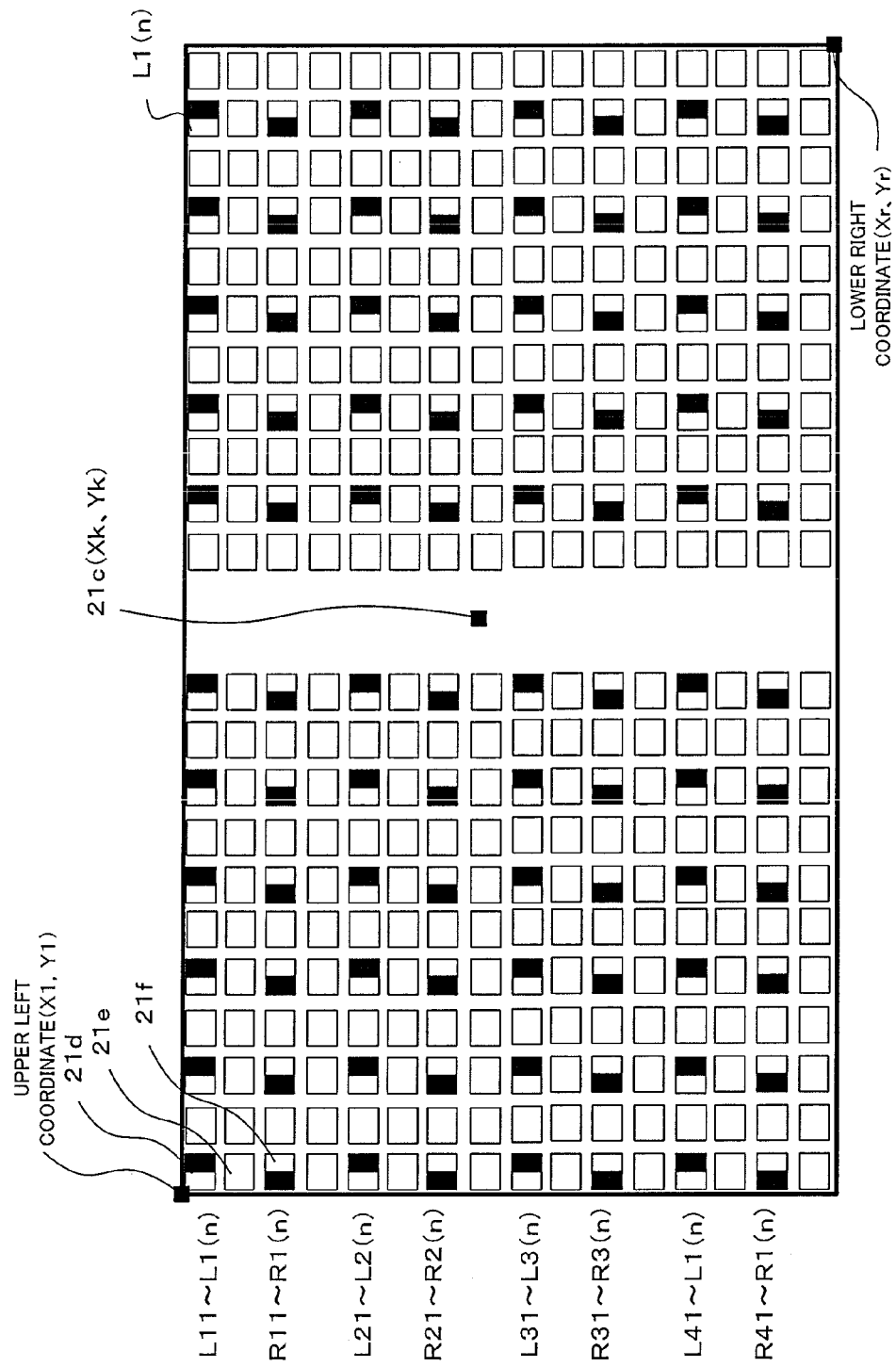
FIG. 4 is an enlarged drawing of a single ranging area of the image sensor of the camera of one embodiment of the present invention

FIG. 4 shows an arrangement example of pixels for a single ranging area. Inside each ranging area shown in FIG. 3 is constituted by phase difference AF detection pixels and imaging pixels, as shown in FIG. 4.

Within the ranging areas shown in FIG. 4, left-side open phase difference AF detection pixels 21d, imaging pixels 21e and right-side open phase difference AF pixels 21f are alternately arranged. Specifically, in the row that is furthest to the left, L11, L21, L31 and L41 are left-side open phase difference AF pixels 21d, R11, R21, R31 and R41 are right-side open phase difference AF pixels 21f, and imaging pixels 21e are arranged between these phase difference AF pixels. Then, there are only imaging pixels 21e in the second row from the left. After that, rows including phase difference AF detection pixels and rows made up of only imaging pixels are repeatedly arranged alternatively.

With this embodiment, a row including phase difference AF detection pixels and a row made up of only imaging pixels are arranged every other row, but it is also possible to have a configuration where two or more rows that are made up of only imaging pixels are arranged between a row including phase difference AF detection pixels and a row that includes phase difference AF detection pixels.

The phase difference pixel generating section 34 (refer to FIG. 2) calculates an average value of pixel values from the left-side open AF detection pixels or an average value of pixel values from the right-side open AF detection pixels, for each pixel row, and an average value for each pixel row becomes an AF pixel row. With this embodiment, since each pixel row is made up of four pixels, addition is performed for every pixel row, and the result of addition is divided by 4. Specifically, average values are generated using the following calculations.

Left-side open AF detection pixel row:

$$L1 = (L11 + L21 + L31 + L41)/4$$
$$L2 = (L12 + L22 + L32 + L42)/4$$
$$L3 = (L13 + L23 + L33 + L43)/4$$
$$...$$
$$Ln = (L1(n) + L2(n) + L3(n) + L4(n))/4$$

Right-side open AF detection pixel row:

$$R1 = (R11 + R21 + R31 + R41)/4$$
$$R2 = (R12 + R22 + R32 + R42)/4$$
$$R3 = (R13 + R23 + R33 + R43)/4$$
$$...$$
$$Rn = (R1(n) + R2(n) + R3(n) + R4(n))/4$$

Also, with the example shown in FIG. 4, the left coordinate is (X1, Y1), a lower right coordinate is (Xr, Yr), and a ranging area central coordinate 21c is (Xk, Yk). Since a central coordinate (Xc[k], Yc[k]) of a ranging area constitutes a position obtained by adding an arbitrary length (a[k], b[k]) respectively to each ranging area from a face central coordinate/specified coordinate (Xco, Yco), the following is derived:

$Xc[k]=Xco+a[k], Yc[k]=Yco+b[k]$.

k is a ranging area number, and is made k=0, 1, 2, ..., Area_num−1 (Area_num:number of ranging areas).

Figure 5:
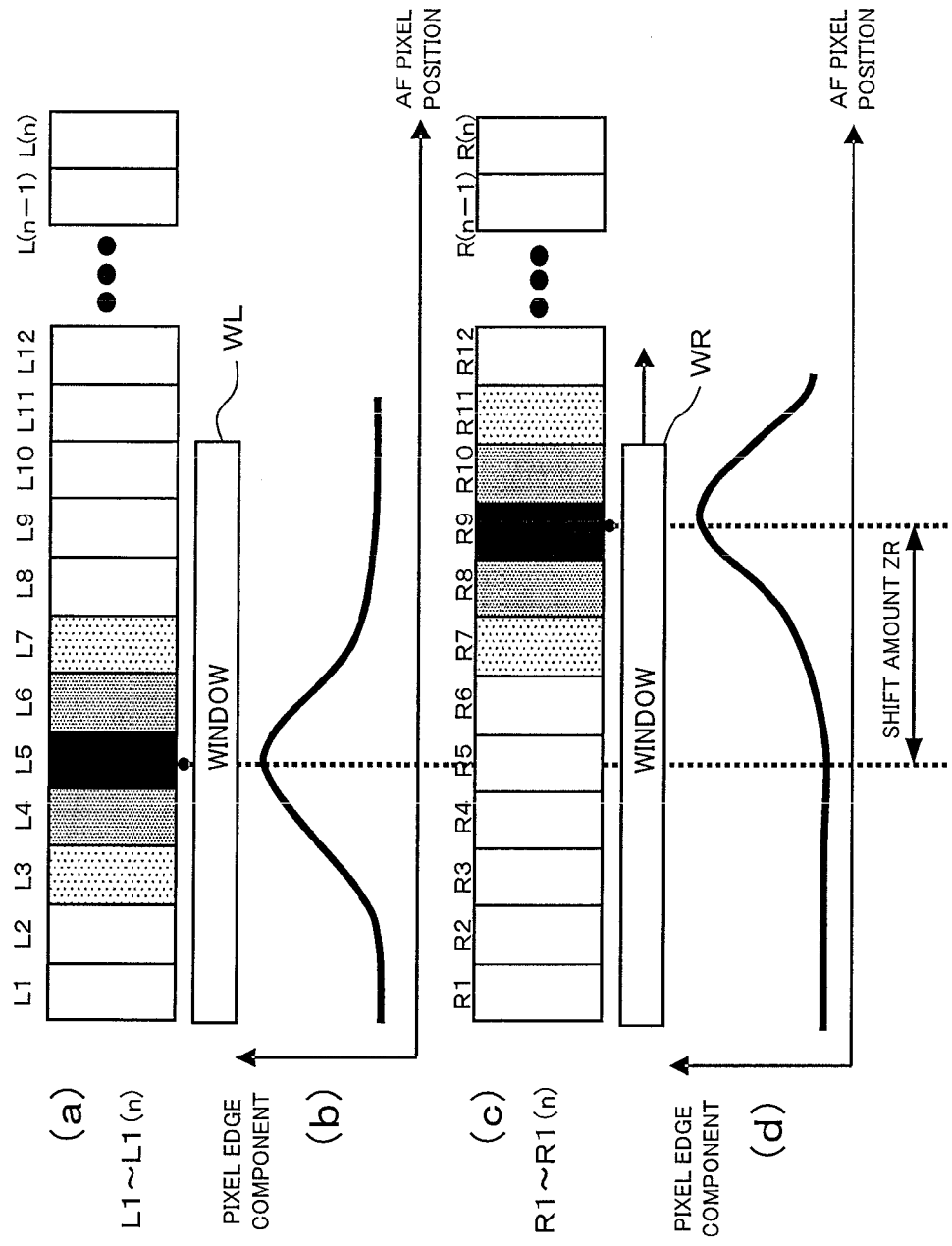
FIG. 5 is a drawing for describing a ranging method of the camera of the one embodiment of the present invention.
Figure 6:
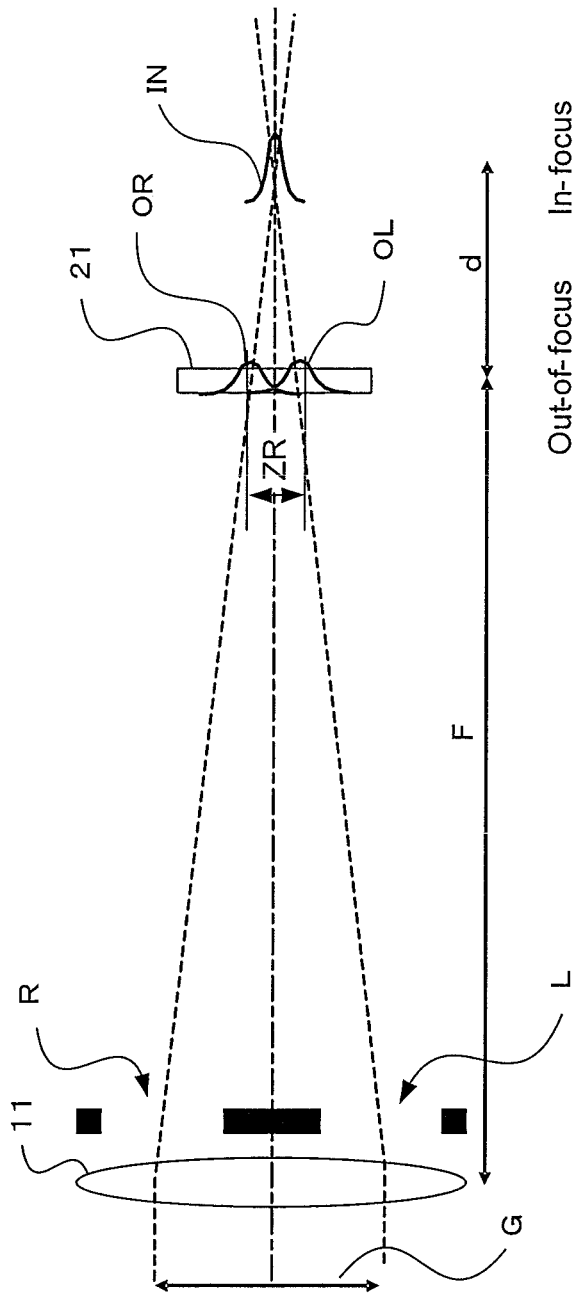
FIG. 6 is a drawing for describing a ranging method of the camera of the one embodiment of the present invention.
Figure 7:
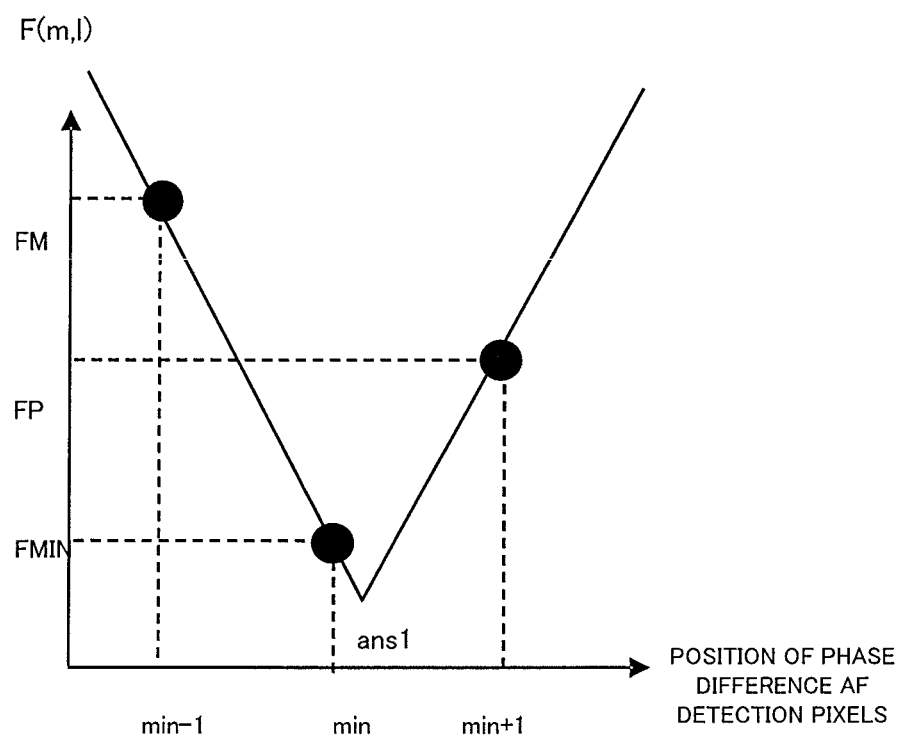
FIG. 7 is a graph showing correlation calculation results, in the camera of one embodiment of the present invention

The defocus amount calculating section/reliability evaluation section 37 subtracts or adds (c[k], d[k]) (c[k], d[k] is a predetermined numerical value for every area, and an x, y direction range for correlation calculation) from the center (Xc[k], Yc[k]) of a ranging area to define an upper left coordinate (X1[k], Y1[k])=(Xc[k]−c[k], Yc[k]−d[k]) and a lower right coordinate (Xr[k], Yr[k])=(Xc[k]+c[k], Yc[k]+d[k]), and carries out calculation to obtain defocus amount in this range based on phase difference AF described using FIG. 5 to FIG. 7.

FIG. 6 is a drawing showing ranging principle for phase difference AF. Within the light flux of the photographing lens 11, a right opening R and a left opening L are provided, and if an image OR corresponding to pixel output based on light flux of only the right opening R on the image sensor 21, and an image OL corresponding to pixel output based on light flux of only the left opening L, are compared, in a case where focus is not achieved, the two images OR and OL are offset by a shift amount ZR. Also, at a focus position that is a defocus amount d away, two images IN coincide. Accordingly, a shift amount ZR is obtained, a defocus amount d based on shift amount ZR is obtained, and the photographing lens 11 is moved to the focus position based on the defocus amount d. Reference numeral G in FIG. 6 represents a distance between centers of the left and right openings, and F represents a distance from the imaging surface to a pupil.

(a) and (b) in FIG. 5 represent pixel values (pixel edge components) corresponding to sequence locations of left-side open phase difference AF detection pixel rows L1−L(n) (corresponding to image OL on FIG. 6). (c) and (d) in FIG. 5 represent pixel values (pixel edge components) corresponding to sequence locations of right-side open phase difference AF detection pixel rows R1−R(n) (corresponding to image OR on FIG. 6). These obtain correlation for subject images formed on left-side open and right-side open pixel rows. A difference between positions of phase difference AF detection pixels where the shapes of subject images are at their most similar becomes shift amount (parallax) ZR.

Regarding this shift amount, for example, a window WL corresponding to a left-side opening pixel row is fixed, and a window WR corresponding to a right-side open pixel row is shifted one pixel at a time, and once movement of the window WR corresponding to the right-side open pixel row is completed, next the window WR corresponding to the right-side open pixel row is fixed, and the window WL corresponding to the left-side open pixel row is shifted one pixel at a time. An evaluation value Fm is obtained from a cumulative value of difference between left side-open phase difference AF detection pixel values within the window WL and right-side open phase difference AF detection pixel values within the window WR at this time. A shift amount at the time that this evaluation value Fm becomes a minimum value is the shift amount ZR FIG. 7 is a graph showing position of phase difference AF detection pixels close to where the evaluation value Fm becomes a minimum value, and Fm. In this graph, evaluation value Fm is smallest where position of the phase difference AF detection pixels is min. Here, evaluation value Fm is discrete data, and so interpolation processing is carried out using a plurality of evaluation values Fm close to the minimum value, and a true minimum value is obtained to calculate shift amount ZR.

Once shift amount ZR has been obtained, defocus amount d can be calculated from shift amount ZR using the following equation (1). Specifically, from the relationship shown in FIG. 6:

$G:ZR=F+d:d$ $(F+d)*ZR-dG=0$ $$d=F*ZR/(G-ZR) \quad (1)$$

Here, d: defocus amount
F: distance from image sensor to pupil
ZR: shift amount
G: distance between centers of left and right side openings The defocus amount calculating section/reliability evaluation section 37 uses correlation value gradient of evaluation value Fm as a reliability value for phase difference AF. Specifically, in the example shown in FIG. 7, a gradient Fs[k] of a line that passes through the minimum value (FMIN) of evaluation value Fm and the largest evaluation value FM, of two evaluation values Fm before and after this minimum value, is calculated as an evaluation value representing reliability, and output. A minimum value ans1 approximated at gradient Fs[k] represents a shift amount at which correlation between two images of the left opening and the right opening becomes highest, and this value is made a two image spacing value. By substituting shift amount ans1 for ZR in equation (1) above, defocus amount d is calculated. A correlation value where degree of correlation is highest is acquired as an extreme value and can be either a minimum value or a maximum value depending on the calculation method for correlation calculation. With the embodiments of this application, an extreme value where degree of correlation is highest is made at a minimum value.

Figure 8A:
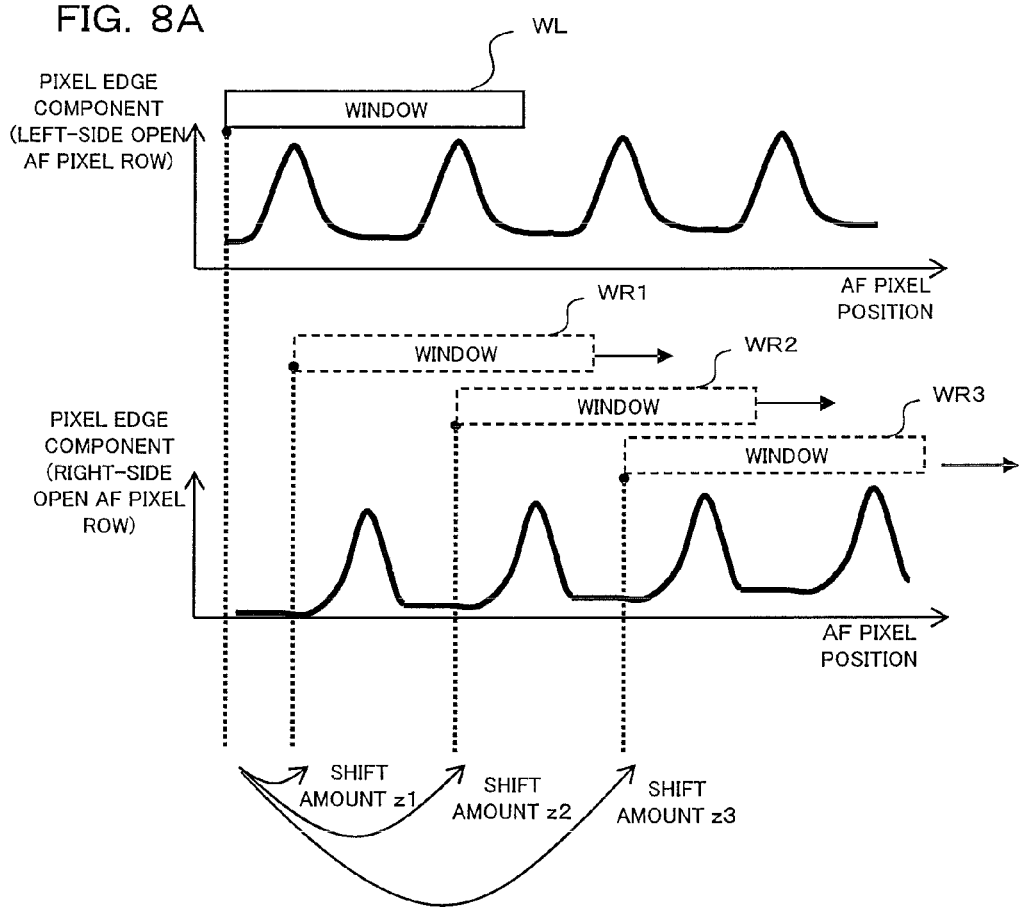
FIG. 8A and FIG. 8B are drawings showing a correlation calculation method in the case where a periodicity-containing subject is ranged, and correlation calculation results, in the camera of one embodiment of the present invention.

Next, a case where a periodicity-containing subject has been ranged using a phase difference AF method will be described using FIG. 8A and FIG. 8B. FIG. 8A shows one example of pixel edge components (pixel output) of a periodicity-containing subject. In FIG. 8A, the upper graph has AF pixel position on the horizontal axis and shows change in pixel edge components of a left-side open AF pixel row on the vertical axis. The lower graph has AF pixel position on the horizontal axis and shows change in pixel edge components of a right-side open AF pixel row on the vertical axis.

Since there is a periodicity-containing subject, the right-side open AF pixel row and the left-side open pixel row both have pixel edge components of the same periodic pattern. Therefore, as shown in FIG. 8A, a window WL for the left-side open AF pixel row is fixed, and if correlation calculation is carried out with window WR1 for the right-side open AF pixel row a shift amount becomes z1, carrying out correlation calculation with window WR2 gives a shift amount of z2, and carrying out correlation calculation with window WR3 gives a shift amount z3.

Figure 8B:
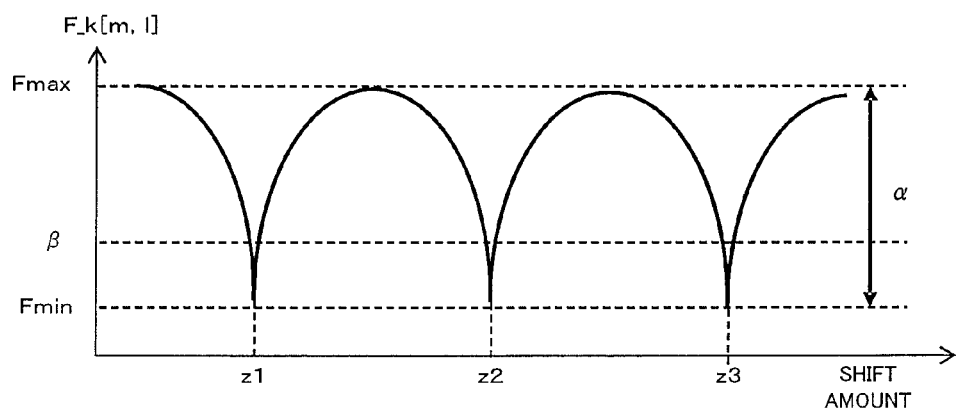

As shown in FIG. 8A, if shift the amount is obtained while sequentially moving from window WR1-WR3, then shift amount becomes a minimum value in the order shift amount z1, z2, z3, as shown in FIG. 8B. If a plurality of minimum values are detected in this way, it is not possible to determine where a true minimum value (specifically, a shift amount corresponding to a true focus point) is, and phase difference AF method ranging becomes difficult. With this embodiment, therefore, in the case where it has been detected that there is a periodicity-containing subject, an algorithm is executed in order to find a true minimum value. It is therefore first detected whether or not there is a periodicity-containing subject.

A detection method for a periodicity-containing subject of this embodiment is carried out based on the following three points (A1)-(A3).

(A1) Total number of minimum values of correlation value (is 2 or more)

(A2) Difference between maximum value Fmax and the minimum value Fmin for correlation value is threshold value α or greater (A3) Minimum value for correlation value is less than threshold value β

With this embodiment, a periodicity-containing subject is determined in the event that all of the above conditions (A1)-(A3) have been satisfied, but it is also possible to omit some of these conditions, or to add other conditions. Also, the threshold values α and β may be fixed values that have been designated in advance, or may be designated externally, or may be capable of being changed depending on other factors.

Next, contrast AF and lens scan will be described using FIG. 9A and FIG. 9B. With this embodiment, in the case of a periodicity-containing subject, a true minimum value (namely a shift amount corresponding to a true focus point) is detected using lens scan and contrast evaluation value.

Figure 9A:
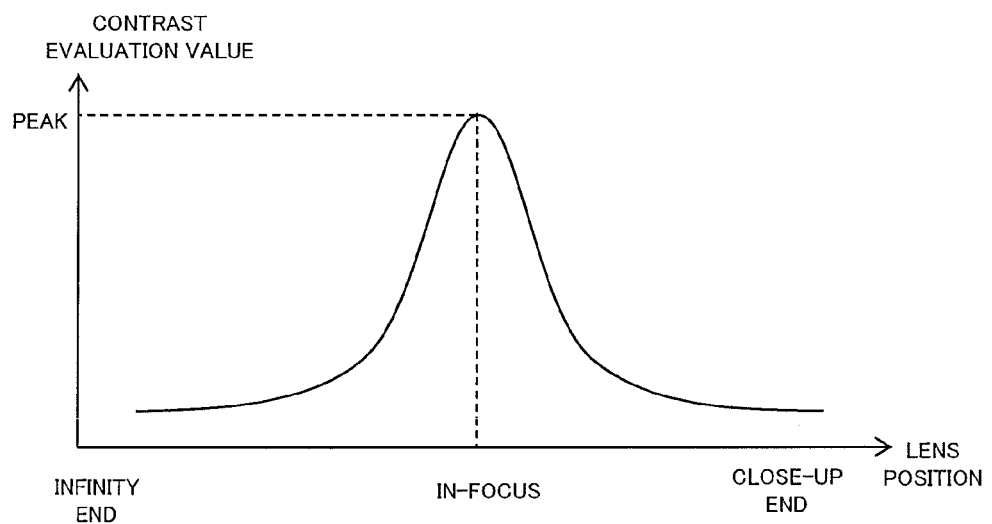
FIG. 9A and FIG. 9B are a graph showing one example of contrast evaluation value, and a drawing showing a lens scan operation, of the camera of one embodiment the present invention.
Figure 9B:
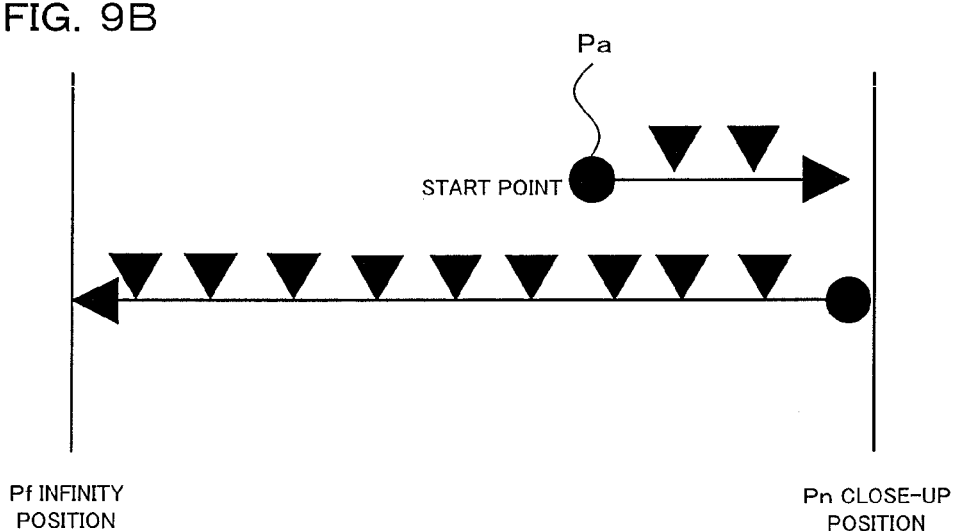

FIG. 9A shows one example of a case where contrast evaluation value has been calculated while moving a focus lens within the photographing lens 11 between the infinity end and the close-up end. The contrast evaluation value is calculated by the contrast evaluation value calculation section 36. Specifically, the contrast evaluation value calculation section 36 calculates the contrast evaluation value by cumulatively adding values after processing imaging pixels rows with filter calculation (extraction of only high-frequency components). The contrast evaluation value is used in so-called hill-climbing method AF. If endpoint to endpoint of the lens drive range is made the horizontal axis, and the vertical axis is made contrast evaluation value, then a graph generally takes a mountain shape, as shown in FIG. 9A. A peak position of this mountain shape means a focus lens position where contrast for a pixel row becomes highest, and is determined to be a focus position.

When it is not possible to carry out AF because reliability of a ranging result is low (refer to Fs[k] that was described using FIG. 7), or at the time of a specified state where a periodicity-containing subject is detected, lens scan is carried out. Lens scan is an operation to move the focus lens at a constant speed from one endpoint of the drive range of the focus lens towards the other endpoint. The example shown in FIG. 9B shows drive of the focus lens from current position Pa towards a close-up end point Pn, and further drive from the close-up end point Pn towards the infinity end point Pf. Pixel values are acquired from phase difference AF detection pixels and imaging pixels while driving the focus lens, and ranging results from phase difference AF, and contrast evaluation values, are associated with lens position. For example, in FIG. 9B, at positions indicated by inverted triangles, pixel values are required and ranging results and contrast evaluation values are acquired. At a position where reliability of ranging results is high the focus lens is stopped, and ranging is carried out again.

Figure 10A:
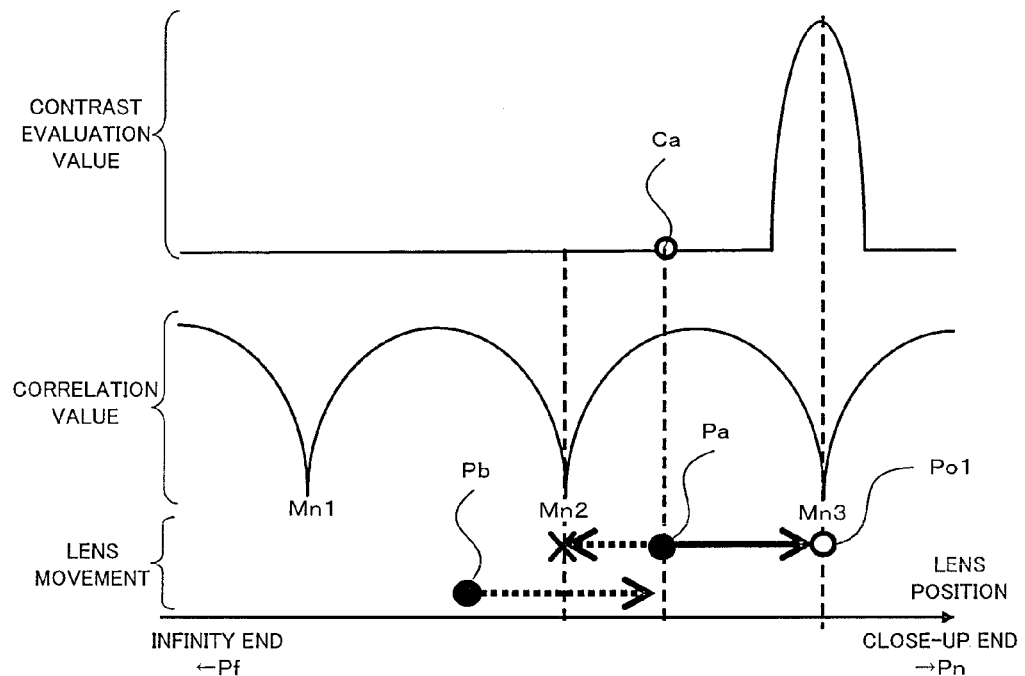
FIG. 10A and FIG. 10B are drawings for describing determination of a minimum value after lens scan has been implemented, with FIG. 10A showing a case where lens scan has not been implemented up to a close-up end point, and FIG. 10B showing a case where lens scan has been implemented up to a close-up end point, with the camera of one embodiment of the present invention.

Next, a selection method for minimum value in accordance with previous lens scan implementation status, in the case where there is a periodicity-containing subject, will be described using FIG. 10A and FIG. 10B. With this embodiment, first, ranging is carried out using phase difference AF in a state where the focus lens is not moved, and in the event that a periodicity-containing subject is determined from this result (refer to S1-S7 in FIG. 16A), lens scan is carried out under specified conditions (refer to S41 in FIG. 17 and S57 and S63 in FIG. 18, which will be described later).

With this embodiment, after commencement of ranging using phase difference AF, if it was initially detected that there was a periodicity-containing subject, then selection of a minimum value differs depending on whether lens scan has been executed once, or where the focus lens has been driven to, such as in (B1) or (B2) below.

(B1) In the case where lens scan has not been executed up to the close-up end point, a minimum value that is closest to the current lens position in the close-up direction is adopted.

(B2) In the case where lens scan has been executed up to the close-up end point, a minimum value that is closest to the current lens position in the infinity direction is adopted. With this determination, determination as to whether or not lens scan has been executed up to the close-up end point is determination as to whether or not lens scan, that was carried out from the time of a half press operation of a release button (first release on) until the current time point, reached the close-up end point.

The case of (B1) above will be described using one example shown in FIG. 10A. With the example shown in FIG. 10A, Mn1, Mn2 and Mn3 are shown as minimum values of correlation value for a periodicity-containing subject. Also, previously lens scan was carried out from a scan start position Pb towards the close-up end point, but lens scan was not completed up to the close-up end point Pn (dotted line arrow to the close-up end). In this situation, Mn2 and Mn3 exist as minimum values close to current position Pa, but minimum value Mn2 that is at a position closest to current lens position Pa is not selected (refer to dotted line arrow towards the infinity end), and instead minimum value Mn3 that is closest to the current lens position Pa in the close-up direction, which is the scan direction, is selected as drive target position Po1 (refer to the solid line arrow towards the close-up end, and S17 in FIG. 16B, which will be described later).

Also, the case of (B2) above will be described using one example shown in FIG. 10B. In this example also, minimum values for correlation value of the periodicity-containing subject are Mn1, Mn2 and Mn3. Lens scan is carried out from a scan start position Pb in the close-up end point direction (Pn direction), and after the close-up end point is reached drive direction is reversed and lens scan continues in the infinity direction (Pf direction) (dotted line arrow towards the infinity end), to give a current position Pa. In this situation, Mn2 and Mn3 exist as minimum values close to the current position Pa, but differing from the case of FIG. 10A, since lens scan is being implemented towards the close-up end point minimum value Mn2 that is closest to the current lens position in the infinity direction is selected as the drive target position Po2 (refer to S21 in FIG. 16B, which will described later).

Figure 16A:
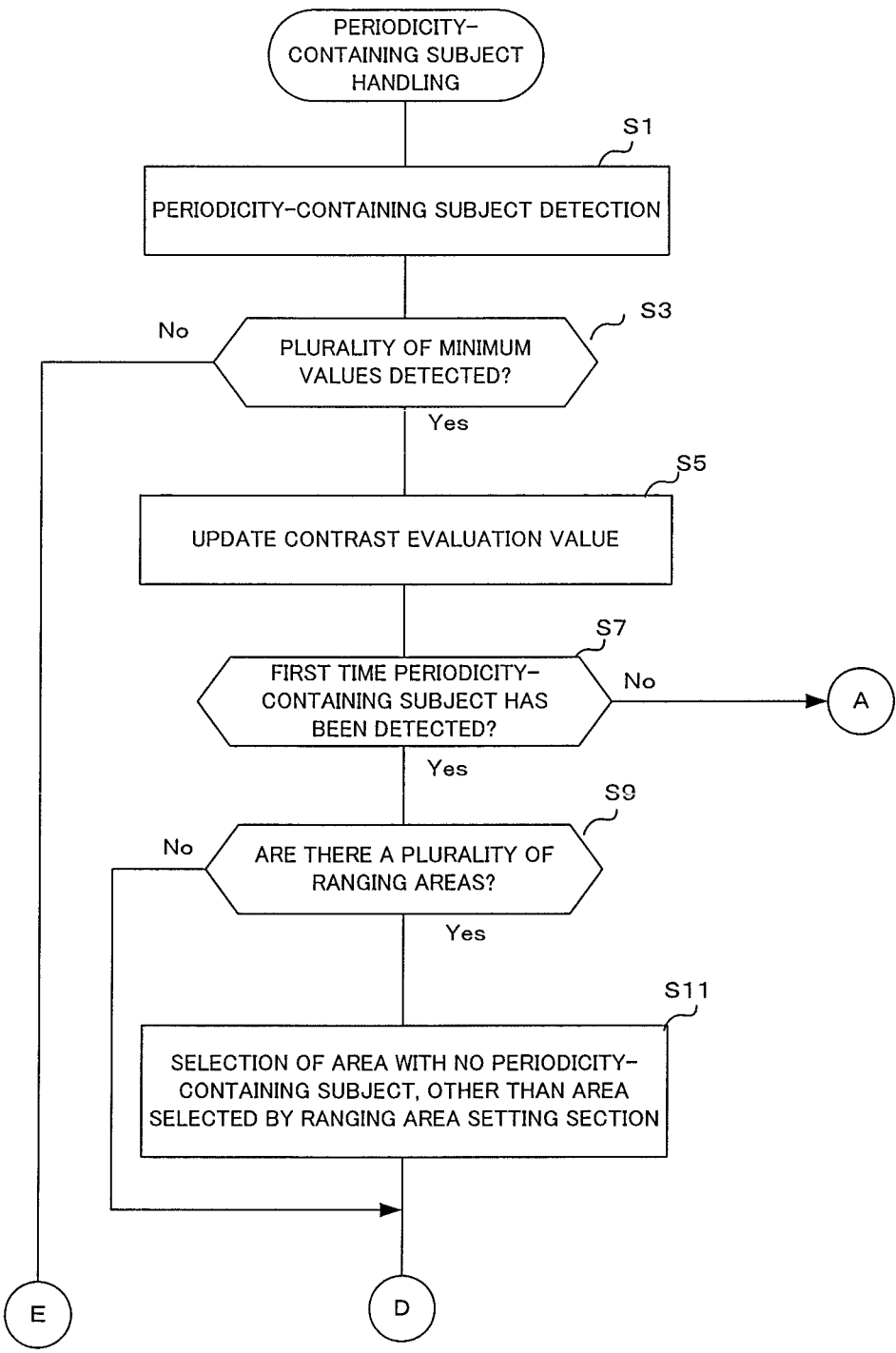
FIG. 16A and FIG. 16B are flowcharts showing a periodicity-containing subject countermeasure operation of the camera of one embodiment of the present invention.
Figure 16B:
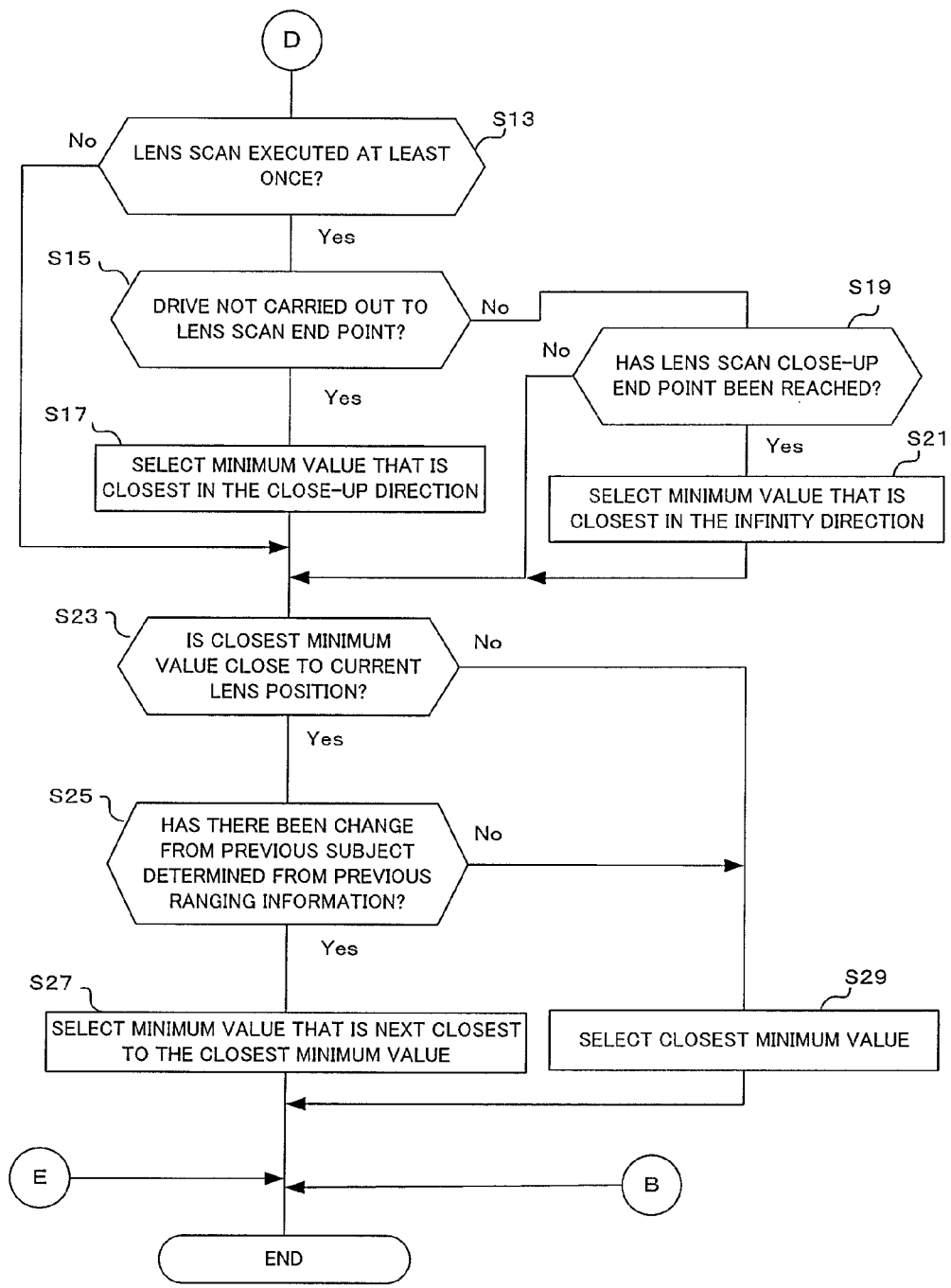
Figure 17:
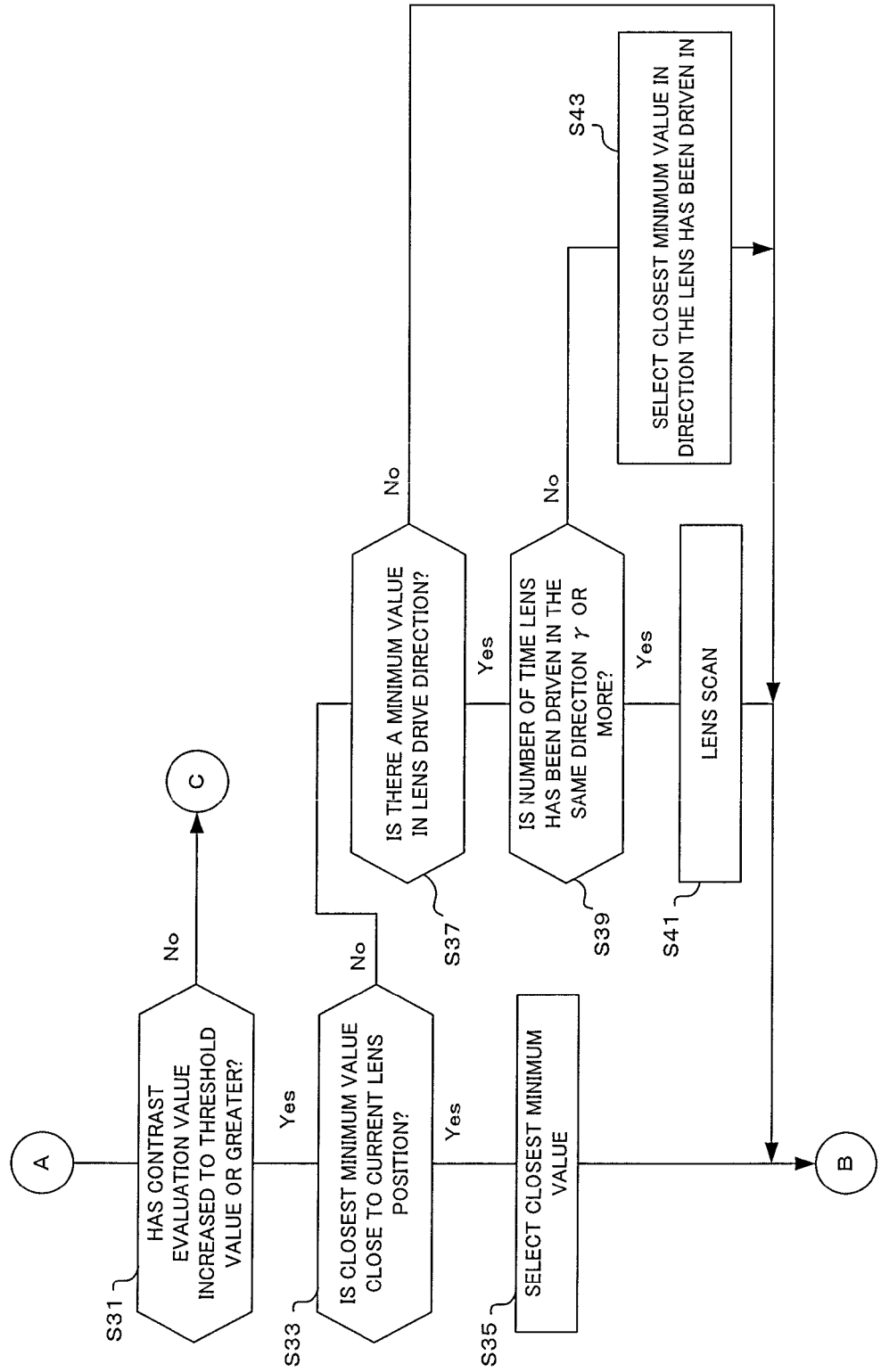
FIG. 17 is a flowchart showing a periodicity-containing subject countermeasure operation of the camera of one embodiment of the present invention.
Figure 18:
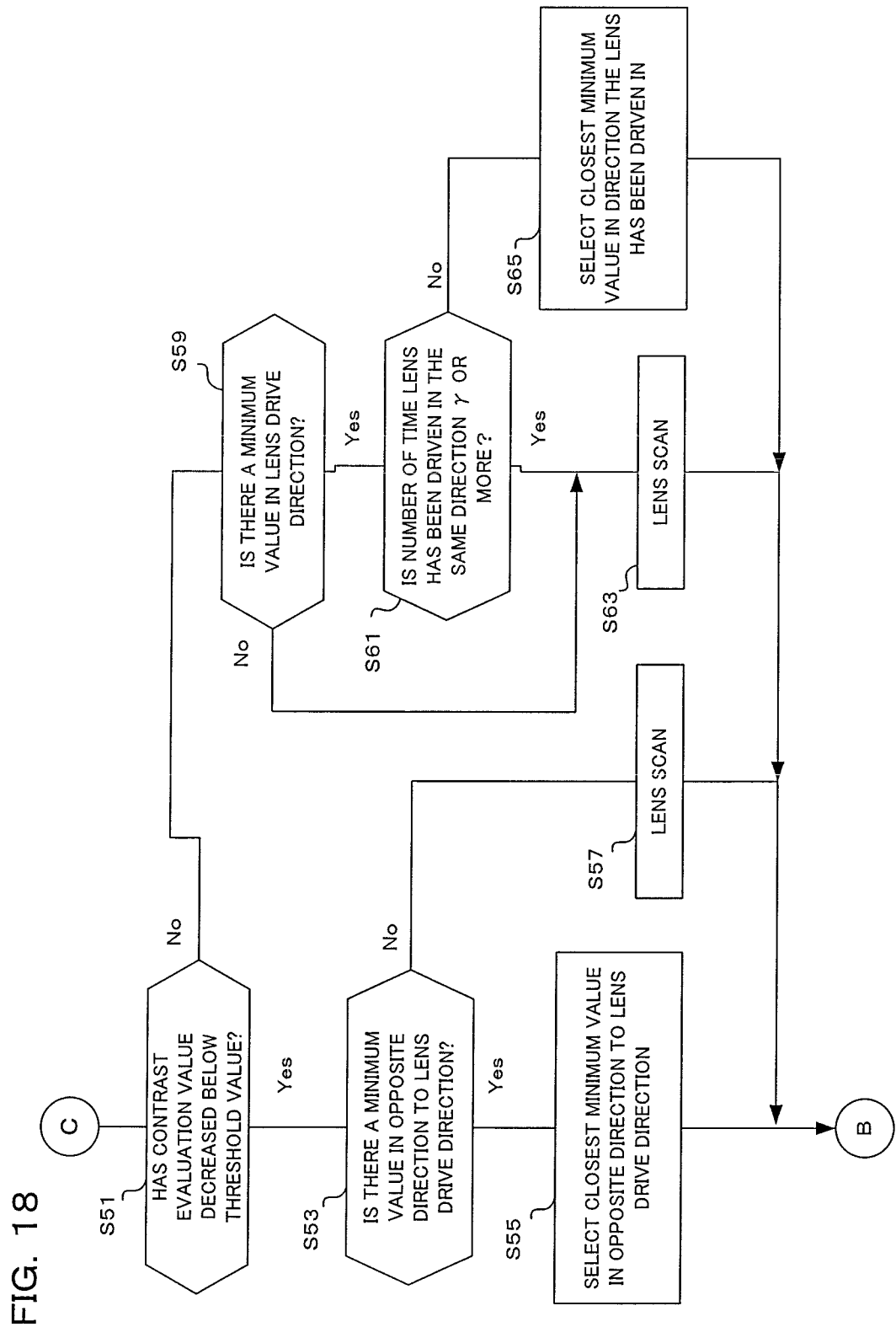
FIG. 18 is a flowchart showing a periodicity-containing subject countermeasure operation of the camera of one embodiment of the present invention.

In this way, in this embodiment, image data is repeatedly acquired while moving the focus lens within a range of movement between the close-up end and the infinity end, and it is possible to carry out a scan operation to execute phase difference detection using the phase difference detection section (defocus amount calculating section/reliability evaluation section 37) (refer to FIG. 9, S41 in FIG. 17, and S57 and S63 in FIG. 18). In the event that a periodicity-containing subject has been determined after carrying out a scan operation, a focus adjustment operation is carried out based on an extreme value, for a which corresponding focus lens position is positioned more towards the close-up end than a current position of the focus lens, among a plurality of extreme values having a high degree of correlation, and which is the closest to the current focus lens position (refer to FIG. 10A and S17 in FIG. 16B).

Figure 10B:
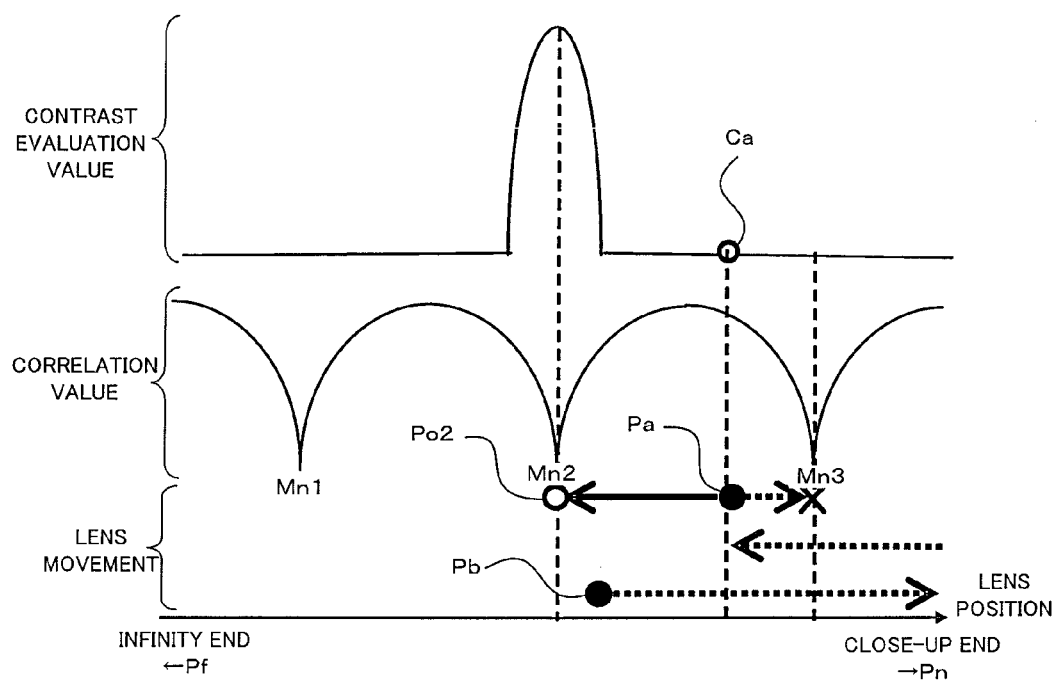

Also, in the event that a periodicity-containing subject has been determined after moving the focus lens to the close-up end when carrying out a scan operation, a focus adjustment operation is carried out based on an extreme value, for which a corresponding focus lens position is positioned more towards the infinity end than a current position of the focus lens, among a plurality of extreme values having a high degree of correlation, and which is the closest to the current focus lens position (refer to FIG. 10B and S21 in FIG. 16B).

In the case of a plurality of ranging areas, an area in which a periodicity-containing subject has not been detected is preferably selected. Should a periodicity-containing subject be detected in an area determined by the ranging area setting section 35, it is possible to change to another ranging area (refer to S9 and S11 in FIG. 16A).

Next, a case where the closest minimum value is very close to the current lens position, when the phase difference detection has been carried out in the case of a periodicity-containing subject, will be described. When the closest minimum value is at a position extremely close to the current lens position, the more distance there is between the minimum value and a true focus position the less change in ranging result or contrast evaluation value will be seen, even if there is lens drive to that position. In that case, rapid lens drive to the next closet minimum value to the closest minimum value is preferable so as to cause change in ranging results for phase difference AF and contrast evaluation value, which is useful for being able to use in determination after that.

Figure 11A:
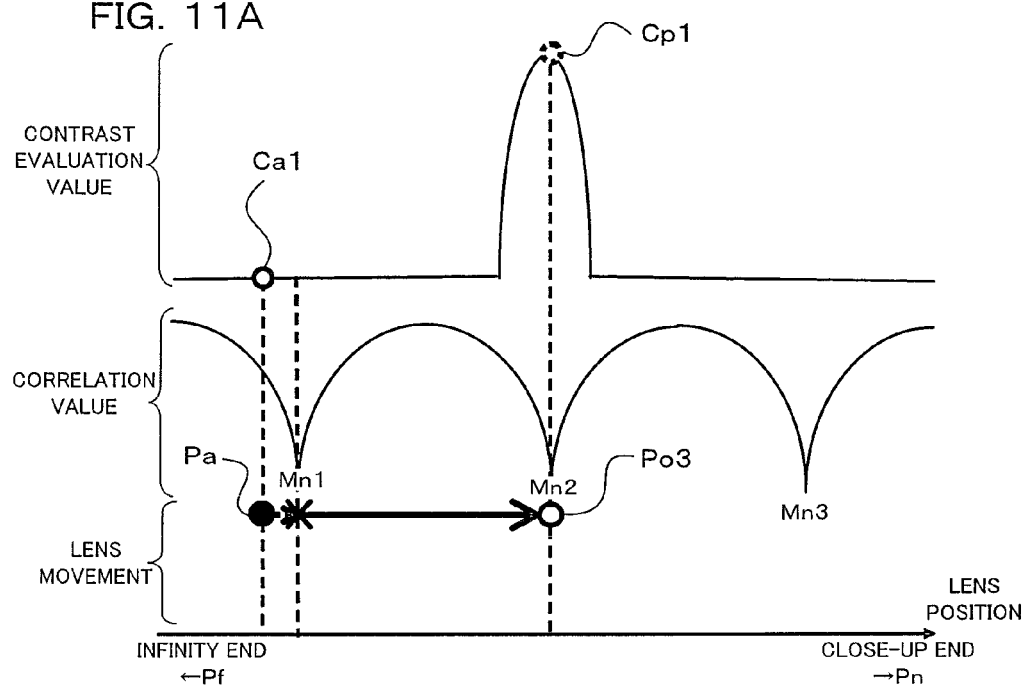
FIG. 11A and FIG. 11B are drawings for describing, in the case of a periodicity-containing subject, determination as to whether or not a subject of minimum value after lens scan is the same subject, with FIG. 11A showing a case where it is determined that it is not the same subject, and FIG. 11B shown a case where it is determined that it is the same subject, in the camera of one embodiment of the present invention.

FIG. 11A is for a case where it has been detected that there is a periodicity-containing subject at the current position Pa, with a contrast evaluation value at the time of previous focus being Cp1, and contrast evaluation value at the current position Pa being Ca1. With this type of example shown in FIG. 11A, a difference between the previous and current contrast evaluation value (Cp1−Ca1) is large, and it is determined that it is not the same subject. In this case, a minimum value that is next closest to the closest minimum value is determined to be the target position Po3. Also, in the case where it is determined to be the same subject, the closest minimum value is determined to be the target position Po4 (FIG. 11B), but this will be described later.

Conversely, in the case where the closest minimum value is away from the current lens position, focus adjustment operation is carried out with the position of the closest minimum value as a focus position. Specifically, when a periodicity-containing subject has been determined, it is determined whether or not a difference between a position of the focus lens shown by a minimum value corresponding to a position that is closest to a current focus lens position, among minimum values having a high degree of correlation, and the current focus lens position, is outside a specified range, and if it is determined that the difference is outside the specified range, a focus adjustment operation is carried out based on the minimum value corresponding to the position that is closest to the current position of the focus lens (refer to S23 and S29 in FIG. 16B). This will be described later.

In this way, with this embodiment, it is determined to focus at the position of the closest minimum value, or to focus at the position of the next closest minimum value, depending on whether a difference between focus lens positions is inside or outside the specified range. Accordingly, in the case where a difference between focus lens positions is within the specified range, a focus adjustment operation is carried out based on the position of the next closest minimum value. However, it can also be considered that the closest minimum value is a true focus position. Therefore, in order to determine whether or not the closest minimum value is a true focus position, determination is based on whether or not it is the same subject, using previous ranging information. The previous ranging information is information at the time of the previous ranging and focusing.

This determination as to whether or not it is the same subject is carried out based on the following (C1) to (C5).

(C1) contrast evaluation value at the time of focus determination (C2) detection results for periodicity-containing subject (C3) edge components (difference between maximum value and minimum value within specified range) of AF pixel row (phase difference AF detection pixel row)

(C4) results of focus determination (C5) time of previous ranging (focus detection)

Some of these conditions may be omitted, and other conditions may be added.

With (C1) to (C5) above, it is specifically determined whether or not it is the same subject, as follows, for example.

(C1) is storing a contrast evaluation value detected at the time of the previous focused attention, and determining the same subject if a difference between the stored contrast evaluation value and a contrast evaluation value detected with the current subject status is a specified value or less.

(C2) is storing numerical values of minimum values and number of minimum values, that are results of detection of a periodicity-containing subject at the time of the previous focus detection, and if a periodicity-containing subject is detected at the time of this focus detection comparing numerical value of that minimum value and number of that minimum value with the stored numerical value and number, and determining the same subject if a difference is in a specified range.

(C3) is storing edge components for an AF pixel row at the time of the previous focus detection, and determining the same subject if a difference between the stored edge components and edge components of an AF pixel acquired for the current subject state is a specified value or less.

(C4) is storing parameters of (C1) to (C3) for when focus was determined previously, comparing some or all of parameters for (C1) to (C3) detected at the time of the current focus detection, and if it is determined that a difference is small, determining that it is the same subject as when focus was determined.

(C5) is storing the time when previous ranging (focus detection) was performed, and if the difference between the storage time and the time when ranging (focus detection) was carried out in the current subject state is within a specified time, determining that some or all of (C1) to (C4) described above will be referenced. If the specified time is exceeded, it is determined to not be the same subject.

Figure 11B:
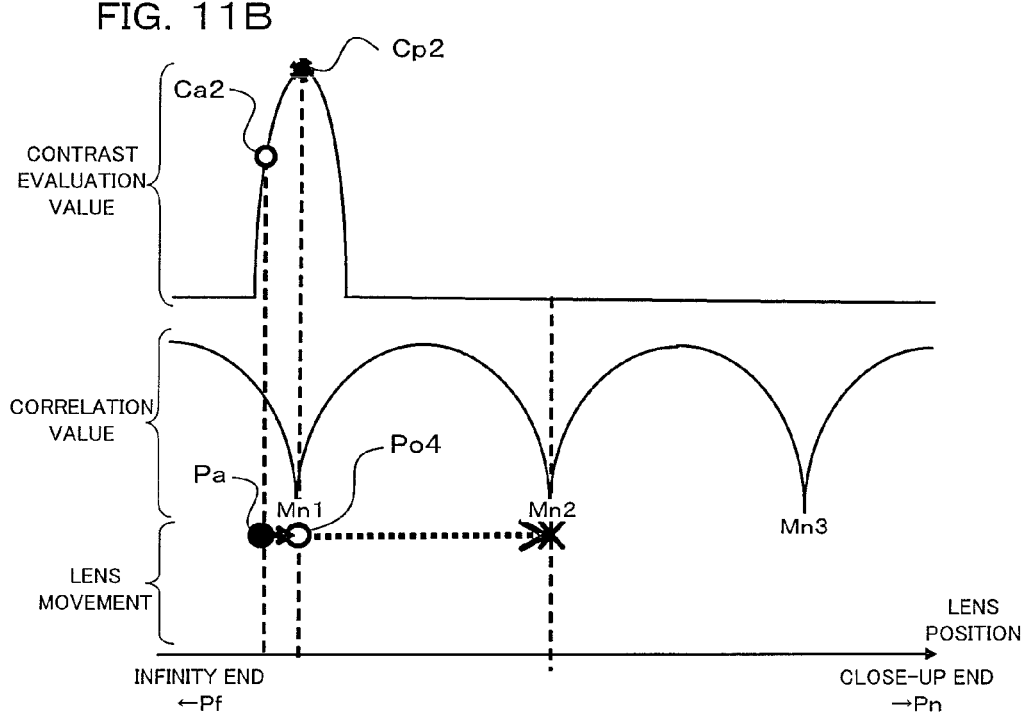

Selecting a particular minimum value as a focus position in accordance with whether or not it is the same subject will be described using FIG. 11B. FIG. 11B is a case where it is been detected that there is a periodicity-containing subject at current position Pa, and in the event that the closest minimum value is a position that is very close to the current lens position, a contrast evaluation value for the time of previous focus is Cp2, and contrast evaluation value at the current position Pa is Ca2. With this type of example shown in FIG. 11B, a difference between the previous and current contrast evaluation value (Cp2−Ca2) is small, and it is determined that it is the same subject. In this case, the closest minimum value is determined to be the target position Po4.

In this way, with this embodiment, in the case where a difference between position of the focus lens represented by an extreme value, among extreme values having a high degree of correlation, corresponding to a position that is closest to the current focus lens position, and current position of the focus lens is within a specified range, if it is detected by a subject change detection section that a subject has changed, a focus adjustment operation is carried out based on an extreme value, among extreme values having a high degree of correlation, corresponding to a position that is the second closest to the current focus lens position (refer to S23, S25 and S27 in FIG. 16B).

The subject change detection section detects a subject image changing from a subject image at the time previous focus, based on image data. This change may be detected based on (C1) to (C5) described above. For example, as shown in FIG. 11B, it is possible to carry out detection based on change of a contrast evaluation value (calculation by the contrast evaluation value calculation section 36) (C1), or alternatively it is also possible to carry out detection based, for example, on edge components of image data (difference between maximum value and minimum value of image signals in a specified range from imaging pixels rows or phase difference AF detection pixel rows) (C3).

Next, direction for lens drive, for driving the focus lens from an initial position to a position corresponding to a minimum value of correlation value, when carrying out an AF operation for a periodicity-containing subject, will be described using FIG. 12 to FIG. 15.

Figure 12:
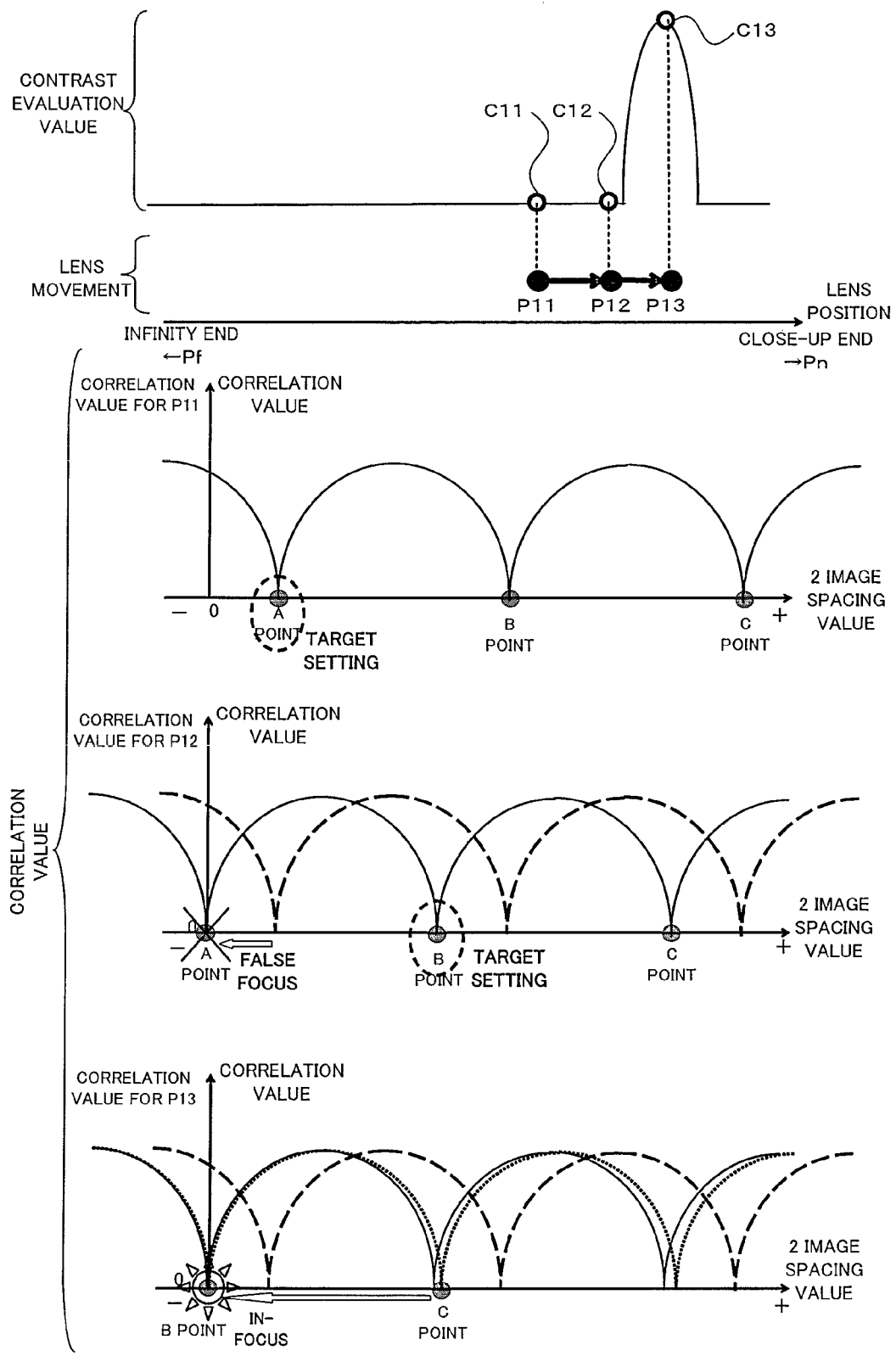
FIG. 12 is a drawing showing one example of lens drive in the case where contrast evaluation value has increased from the previous frame to the current frame, with the camera of one embodiment of the present invention.

FIG. 12 shows one example of a lens drive method in the case where contrast evaluation value has increased from the previous frame to the current frame. The focus lens is sequentially moved from initial position P11 through positions P12 and P13 corresponding to minimum values of correlation value (A point, B point) toward the close-up end, and contrast evaluation values C11, C12 and C13 are acquired at the respective positions. At position P12 corresponding to the minimum value A point that is closest in the direction of the close-up end, the acquired contrast evaluation value C12 has increased very slightly from the contrast evaluation value C11 acquired at position P11. In this way it is determined that there is a focus position in the close-up end direction, and the focus lens is moved further to position P13 corresponding to the second closest minimum value B point to the close-up end. Then, the contrast evaluation value C13 acquired at position P13 corresponding to the second closest minimum value B point is significantly higher than contrast evaluation value C11 and contrast evaluation value C12, and approximately corresponds to peak of contrast evaluation value, and focus is achieved at position P13.

Figure 13:
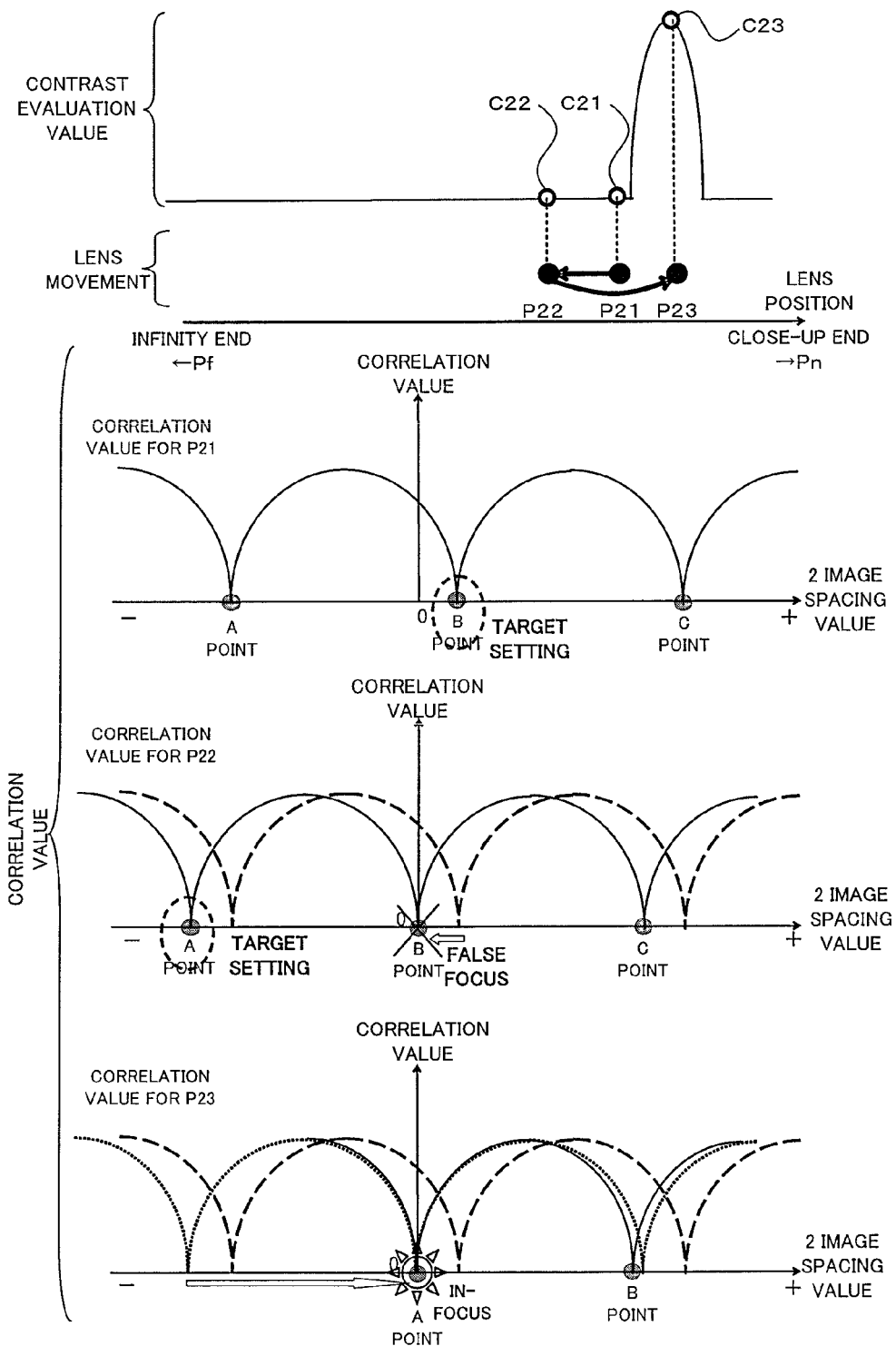
FIG. 13 is a drawing showing one example of lens drive in the case where contrast evaluation value has decreased from the previous frame to the current frame, with the camera of one embodiment of the present invention.

FIG. 13 shows one example of a lens drive method in the case where contrast evaluation value has decreased from the previous frame to the current frame. If contrast evaluation value C21 is acquired at position P21, the focus lens is moved towards the infinity end, and contrast evaluation value C22 is acquired at position P22. After that, drive direction is reversed to move the focus lens towards the close-up end, contrast evaluation value C23 is acquired at position P23, and at this position focus is achieved. Contrast evaluation value C22 that was acquired after moving the focus lens from the initial position P21 to position P22 corresponding to minimum value B point is slightly smaller than contrast evaluation value C21, and so contrast evaluation value has reduced. In this way, focus point is determined to be in the opposite drive direction, and so drive direction is reversed at position P22, and the focus lens is moved to position P23 corresponding to minimum value A point positioned towards the infinity end (opposite direction to the lens direction at this time). The contrast evaluation value C23 acquired at position P23 is much higher than contrast evaluation values C22 and C21, and approximately corresponds to a peak of contrast evaluation value, and focus is achieved at position P23.

Figure 14:
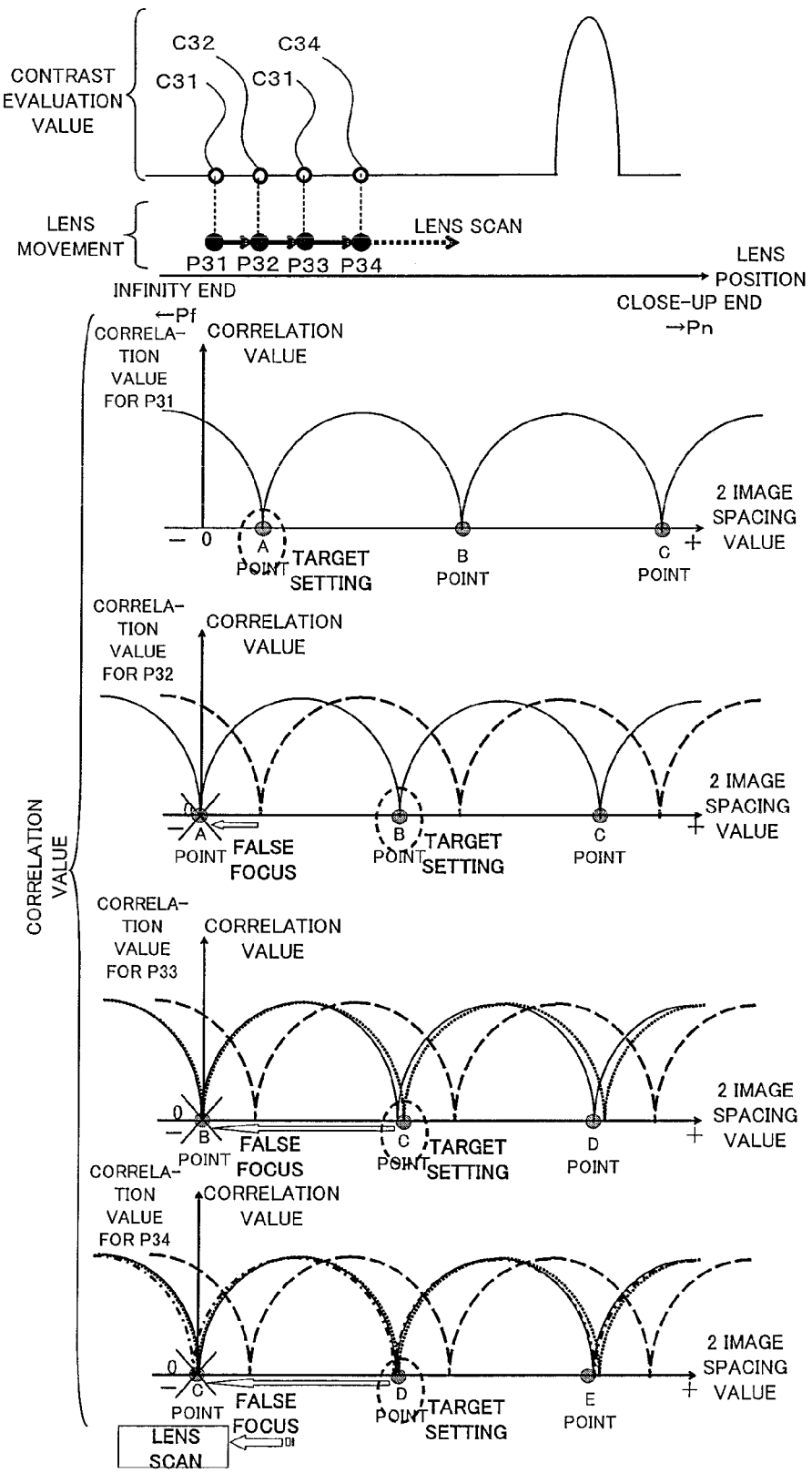
FIG. 14 is a drawing showing one example of lens drive, in a case where there is no change in contrast evaluation value even if lens drive is performed a plurality of times, in the camera of one embodiment of the present invention.

FIG. 14 is shows one example of a lens drive method, in a case where there is no change in contrast evaluation value even if lens drive is performed a plurality of times. With this example, in the event that there is no change in contrast evaluation value, even if lens drive is performed a specified number of times in the same direction, lens scan is carried out. FIG. 14 shows a case where although respective contrast evaluation values C31, C32, C33 and C34 are acquired at the initial position P31 and that positions P32, P33 and P34 corresponding to minimum values of correlation values (A, B and C points), there is no change in these values. This corresponds, for example, to a defocused state, very far from a focus point. In this case, lens scan is carried out, and with lens scan ranging results from phase difference AF and contrast evaluation values are calculated using pixel signals from phase difference AF detection pixels and imaging pixels while driving the focus lens, and these values are associated with lens position.

Figure 15:
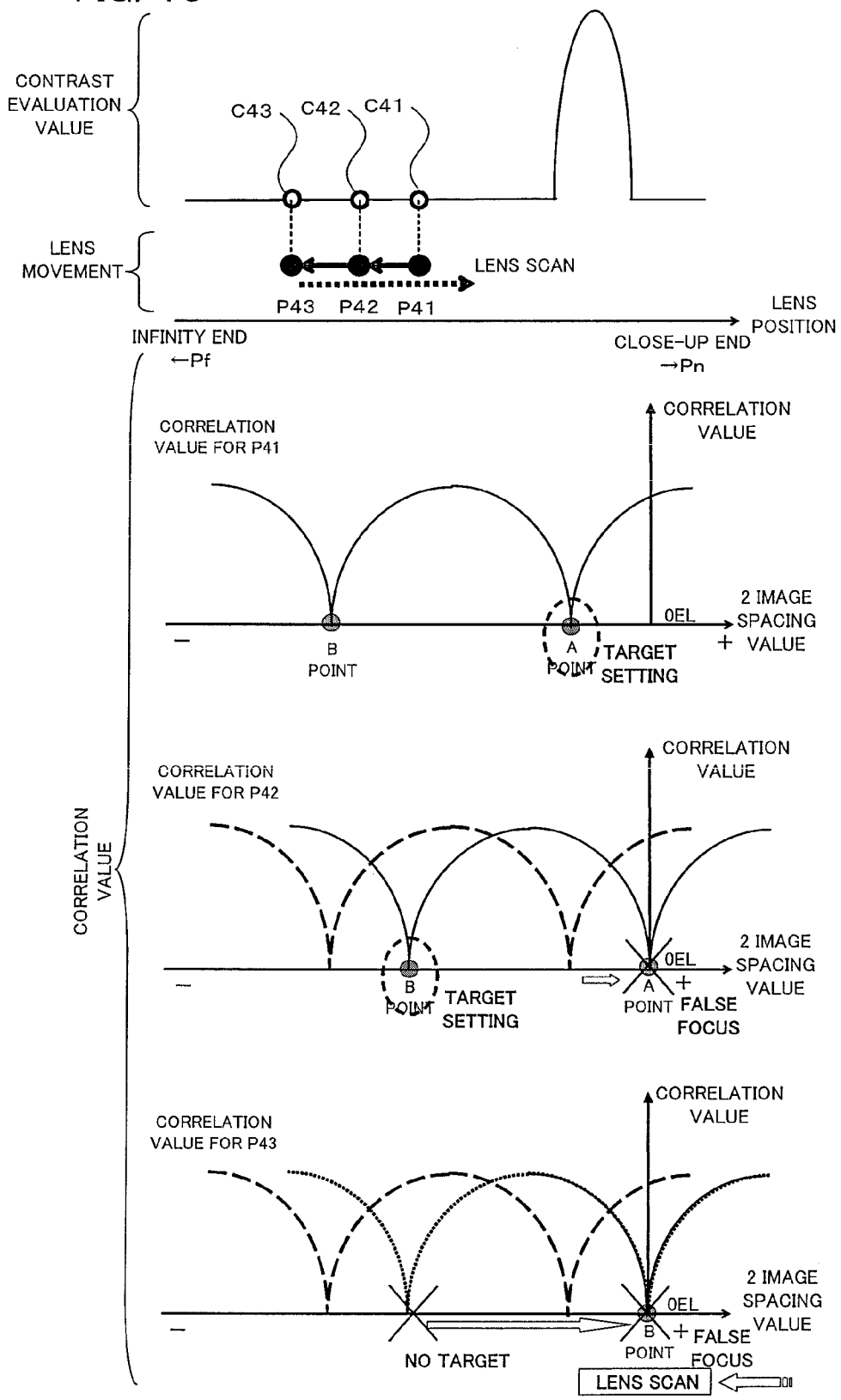
FIG. 15 is a drawing showing one example of lens drive, in a case where there is no change in contrast evaluation value even if lens drive is performed a plurality of times, in the camera of one embodiment of the present invention.

FIG. 15 is shows another example of a lens drive method, in a case where there is no change in contrast evaluation value even if lens drive is performed a plurality of times. With this example, in the state where lens drive is being carried out towards the infinity end, in the case that no minimum value exists in the infinity direction the lens drive direction is reversed and lens scan is carried out towards the close-up end. FIG. 15 shows a case where although respective contrast evaluation values C41, C42, and C43 are acquired at the initial position P41 and at positions P42, and P43 corresponding to minimum values of correlation values (A and B points), there is no change in these values. In this case the lens drive direction is reversed from the infinity end to the close-up end, and lens scan is carried out. This is based on a close-up priority point of view, which considers that the probability of the main subject being at a closer distance is generally high. With lens scan, ranging results from phase difference AF and contrast evaluation values are calculated using pixel signals from phase difference AF detection pixels and imaging pixels while driving the focus lens, and these values are associated with lens position.

In this way, with this embodiment, in the case where a periodicity-containing subject has been detected, the focus lens is driven from an initial position, and a direction for lens drive is determined in accordance with contrast evaluation value for every focus lens position. This means that even if a periodicity-containing subject has been detected it is possible to detect a true focus point using minimal lens drive. Also, as shown in FIG. 13, after executing a focus adjustment operation based on an extreme value corresponding to a position closest to focus, or an extreme value corresponding to a position that is second closest, if a periodicity-containing subject is again determined by the periodicity-containing subject detection section (periodicity-containing subject handling section 38) (refer to S7 in FIG. 16A, which will be described later), then change in contrast evaluation value is determined (referred to S31 in FIG. 17 and S51 in FIG. 18), and if this contrast evaluation value has decreased, a focus adjustment operation is carried out based on a minimum value corresponding to a position that is closest to focus or a minimum value corresponding to focus offset which is in an opposite direction with respect to the second closest minimum value with the focus position as a base point (S55 in FIG. 18).

Next, operation for periodicity-containing subject handling of this embodiment will be described using the flowcharts shown in FIG. 16A to FIG. 18. This flow is executed by a CPU etc., not shown, controlling each of the sections shown in FIG. 1 and FIG. 2 based on programs stored in non-volatile memory (not shown).

If the flow for periodicity-containing subject handling shown in FIG. 16A to FIG. 18 is entered, first periodicity-containing subject detection is carried out (S1). Here, as was described using FIG. 8A and FIG. 8B, correlation calculation is carried out using pixel signals from phase difference AF detection pixels rows, and periodicity-containing subject detection is carried out in accordance with detection conditions (A1)-(A3).

If periodicity-containing subject detection has been carried out, it is next determined whether or not a plurality of minimum values have been detected (S3). Here, it is determined whether or not there are a plurality of minimum values based on results of correlation calculation that were detected in the periodicity-containing subject detection of step S1. If the result of this determination is that a plurality of minimum values were not detected, then as there is not a periodicity-containing subject the flow for periodicity-containing subject is completed.

If the result of determination in step S3 is that a plurality of minimum values have been detected, next update of contrast evaluation value is carried out (S5). Here, the contrast evaluation value was described using FIG. 9A is calculated based on pixel signals from imaging pixels.

Once update of contrast evaluation value has been carried out, it is next determined whether or not detection of a periodicity-containing subject is the first time (S7). A ranging operation is carried out a number of times until a focus point is reached, and in this step it is determined whether or not detection of the periodicity-containing subject is an initial detection after a half press operation of a release button.

If the result of determination in step S7 is that it is the first time a periodicity-containing subject has been detected, it is next determined whether or not there are a plurality of ranging areas (S9). Ranging areas are set by the ranging area setting section 35 based on information relating to central coordinates of an object of ranging from the face detection section 22a etc., and at this time there may be cases where a plurality of ranging areas are set. In this step, it is determined whether or not a plurality of ranging areas have been set by the ranging area setting section 35.

If the result of determination in step S9 is that a plurality of ranging areas have been set, an area in which there is no periodicity-containing subject, outside of an area that has been selected by the ranging area setting section, is selected (S11). In the detection of the periodicity-containing subject in step S1, since correlation calculation is carried out for every ranging area that has been set, in this step a ranging area with no periodicity-containing subject is selected based on correlation calculation results. Although not shown in the drawings, in the case where a ranging area with no periodicity-containing subject has been selected, the periodicity-containing subject handling flow is completed.

If the result of determination in step S9 was that there was not a plurality of ranging areas, or if area selection has been carried out in step S11 (although not shown in the drawings, there may be cases where it is not possible to select an area in which there is no periodicity-containing subject), it is next determined whether or not lens scan has been carried out once (S13). Here, it is determined whether or not the lens scan that was described using FIG. 9A and FIG. 9B has been carried out after a half press operation of the release button.

If the result of determination in step S13 was that lens scan has been carried out at least once, it is then determined whether or not there has not been drive to the lens scan end point (S15). As was described using FIG. 10A and FIG. 10B, in the case where lens scan has been carried out also, selection of minimum value differs in accordance with whether or not drive has been performed to the close-up endpoint. Here, determination is based on drive history of the focus lens.

If the result of determination in step S15 is that drive has not been carried out to the endpoint with lens scan, the closest minimum value in the close-up direction is selected (S17). Here, as was described using FIG. 10A, the closest minimum value in the close-up direction is selected.

If the result of determination in step S15 was that drive has been carried out to the lens scan end point, it is determined whether or not the lens scan close-up end point has been reached (S19). Here, as was described using FIG. 10B, the closest minimum value in the infinity direction is selected.

If minimum value selection has been carried out in step S17 or S21, or if the result of determination in step S13 was that lens scan was not executed once, or if the result of determination in step S19 was that the lens scan close-up end point was not reached, it is next determined whether or not the closest minimum value is close to the current lens position (S23). As described previously, when the closest minimum value is at a position extremely close to the current lens position, as that minimum value moves away from a true focus position hardly any change in ranging result or contrast evaluation value will be seen, even if there is lens drive to that position. With this embodiment, therefore, selection of minimum value differs in accordance with whether or not the closest minimum value is within a specified range from the current lens position. In this step, determination uses results of correlation value calculation detected in step S1, and information on the current lens position.

If the result of determination in step S23 was that the closest minimum value and the current lens position are in a specified range, it is determined whether or not there is change from the previous subject by using previous ranging information (S25). As was described using FIG. 11A and FIG. 11B, if the closest minimum value is determined as being for the same subject, there is a possibility that this is a true focus position. In this step, therefore, determination uses previous ranging information etc. (such as conditions C1-C5). If the result of this determination is that the previous subject and the subject at the current lens position are not the same, as shown in FIG. 11A, a minimum value that is next closest to the closest minimum value is selected, while if the previous subject and the subject at the current lens position are the same, as shown in FIG. 11B, the closest minimum value is selected.

If the result of determination in step S25 is Yes, the next closest minimum value to the closest minimum value is selected (S27). In this case, since the previous subject in the subject at the current lens position are not the same, as shown in FIG. 11A, the next closest minimum value to the closest minimum value is selected.

If the result of determination in step S23 is that the closest minimum value is not within the specified range of the current lens position, or if the result of determination in step S25 was No, the closest minimum value is selected (S29).

Returning to step S7, if the result of determination in this step is that periodicity-containing subject detection was not the first time (namely that it was the second or subsequent time), it is determined whether or not the contrast evaluation value has increased to a threshold value or greater (S31). In the case where the contrast evaluation value that was described using FIG. 9A has increased to a threshold value or greater, then it is close to the peak (focus position) shown in FIG. 9A.

If the result of determination in step S31 was that the contrast evaluation value has increased to the threshold value or more, it is next determined whether or not the closest minimum value is close to the current lens position (S33). Here, determination as to whether the closest minimum value is within a specified range of the current lens position is based on the correlation value that was detected in step S1 and positional information on the focus lens at that time.

If the result of determination in step S33 is that the closest minimum value is close to the current lens position, the closest minimum value is selected (S35). This minimum value is selected because the contrast evaluation value has increased to the threshold value or more and the closest minimum value is within the specified range of the current lens position.

If the result of determination in step S33 was that the closest minimum value was not close to the current lens position, it is next determined whether or not there is a minimum value in the lens drive direction (S37). Here, determination is based on the drive direction of the focus lens and correlation value detected in Step S1.

If the result of determination in step S37 is that there is a minimum value in the lens drive direction, it is next determined whether or not the number of times that there has been lens drive in the same direction is γ or greater (S39). If the result of this determination is that lens drive has not been carried out in the same direction γ times or more, a minimum value that is closest in the direction that the lens is being driven in is selected (S43). Since there is a possibility of the closest minimum value being at the focus position, this closest minimum value is selected.

On the other hand, if the result of determination in step S39 is that the number of times there has been lens drive in the same direction is γ or greater, lens scan is carried out (S41). In the event the focus is not reached, even with drive in the same direction γ times or more, there is a high possibility that a nearby focus position does not exist, and so the lens scan that was described using FIG. 9B is carried out. Here, contrast evaluation values are calculated by the contrast evaluation value calculation section 36 while moving the focus lens at a constant speed from one end to the other end of the drive range of the focus lens.

Returning to step S31, if the result of this determination is that the contrast evaluation value has not increased to the threshold value or greater, it is next determined whether or not the contrast evaluation value has decreased to below the threshold value (S51). In the case where the contrast evaluation value that was described using FIG. 9A has decreased to below the threshold value, then it is far away from the peak (focus position) shown in FIG. 9A.

If the result of determination in step S53 is that the contrast evaluation value has decreased to the threshold value or less, it is next determined whether or not there is a minimum value in the opposite direction to the lens drive (S53). Here, determination as to whether or not there is a minimum value in an opposite direction to the drive direction is based on the drive direction information of the focus lens up to that point, and correlation value detected in Step S1.

If the result of determination in step S53 is that there is a minimum value in the opposite direction to the lens drive direction, the closest minimum value in the opposite direction to the lens drive direction is selected (S55). Since the contrast evaluation value has decreased, there is no extreme value corresponding to a focus position in the current drive direction, and so a minimum value in the opposite direction to the drive direction is selected.

If the result of determination in step S53 is that there is not a minimum value in the opposite direction to the lens drive direction, lens scan is carried out (S57). In the event that there is no minimum value in the opposite direction to the lens drive direction, there is a high possibility that a nearby focus position does not exist, and so the lens scan that was described using FIG. 9B is carried out. Here, contrast evaluation values are calculated by the contrast evaluation value calculation section 36 while moving the focus lens at a constant speed from one end to the other end of the drive range of the focus lens.

Returning to step S51, if the result of this determination is that the contrast evaluation value has not decreased to below the threshold value, then since the result of determination in steps S31 and S51 is that the contrast evaluation value has not increased to the threshold value or greater and has not decreased below the threshold value, it is a case of there being change of the contrast evaluation value within a specified range, as shown in FIG. 14 and FIG. 15. In this case, it is first determined whether or not there is a minimum value in the lens drive direction (S59). If the result of this determination is that there is a minimum value in the lens drive direction, it is determined whether or not the number of times that there has been lens drive in the same direction is γ or greater (S61).

If the result of determination in step S59 is that there is not a minimum value in the lens drive direction, or if the result of determination in step S61 was that the number of times lens drive was performed in the same direction was γ or more, lens scan is carried out (S63). These cases are the state that was shown in FIG. 14 and FIG. 15, and lens scan is carried out.

If the result of determination in step S61 is that lens drive has not been carried out in the same direction γ times or more, a minimum value that is closest in the direction that the lens is being driven in is selected (S65). In this case, since there is a minimum value in the lens drive, and the number of times that lens drive has been carried out in the same direction has not reached γ, a minimum value that is closest in the drive direction is selected.

If the minimum value selection of steps S27, S29, S35, S43, S55, or S65 has been carried out, or if lens scan has been carried out in steps S41, S57 or S63, the flow for periodicity-containing subject handling is completed. In the event that selection of a minimum value has been performed, the focus lens is driven to a lens position corresponding to the minimum value, and ranging using phase difference AF is carried out again. This flow for periodicity-containing subject handling is repeated each time ranging using phase difference AF is carried out, until the focus lens is focused. Also, if lens scan is carried out, automatic focus adjustment is carried out using the so-called hill-climbing method until focus is reached.

As has been described above, with the one embodiment of the present invention, if it is determined that there is a periodicity-containing subject (S1 and S3 in FIG. 16A), it is determined whether or not a difference between the position of the focus lens represented by a minimum value, among extreme values having a high degree of correlation, corresponding to a position that is closest to focus and the current position of the focus lens is outside a specified range (S23 in FIG. 16B), and if the difference is determined to be outside the specified range a focus adjustment operation is carried out based on an extreme value corresponding to the closest position to the focus (S29 in FIG. 16B). This means that even if a periodicity-containing subject has been detected it is possible to detect a true focus point using minimal lens drive, and a high-speed AF system is made possible.

Specifically, with the related art technology disclosed in patent publication 1 above, in the event that a current lens position is a position that is far away from the vicinity of a focus point, there is hardly any change in contrast evaluation value close to the current lens position, and there is a possibility of erroneous focus direction determination. Also, in the case where focus direction determination has been carried out by driving the focus lens by a specified amount, the lens drive becomes only for direction detection, and the time taken until a true focus point is found will be increased. Conversely, with this embodiment, since a focus adjustment operation is carried out based on the relationship between position of the focus lens represented by an extreme value having a high degree of correlation and the current focus lens position, there is no mistaking the focus direction, and it is possible to detect a true focus point rapidly.

With the one embodiment of the present invention, so-called image plane phase difference AF, where phase difference AF detection pixels are arranged on the image sensor 21, has been adopted for phase difference AF detection. However, this is not limiting, and it is also to provide a phase difference detection section separately from the image sensor 21.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal (PDA: Personal Digital Assistant), personal computer (PV), tablet type computer, game console etc. In any event, it is possible to adopt the present invention as long as a device adopts phase difference AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment unit, having a photographing lens that includes a focus lens, for carrying out a focus adjustment operation based on image data that is generated by receiving light of a pupil divided subject image by means of the photographing lens and subjecting the received light to photoelectric conversion, comprising:

a phase difference detection section for detecting extreme values having a high degree of correlation, based on the image data, a periodicity-containing subject determination section for determining a periodicity-containing subject in the case where the phase difference detection section detects many extreme values having a high degree of correlation, and a control section for, when a periodicity-containing subject has been determined, determining whether or not a difference between a position of the focus lens shown by an extreme value corresponding to a position that is closest to a current focus lens position, among extreme values having a high degree of correlation, and the current focus lens position, is outside a specified range, and if it is determined that the difference is outside the specified range, carrying out a focus adjustment operation based on the extreme value corresponding to the position that is closest to the current position of the focus lens.

2. The focus adjustment unit of claim 1, further comprising:

a subject change detection section for detecting whether or not a subject has changed from a subject at the time of previous focus, based on the image data, and wherein the control section, in the case where a difference between position of the focus lens represented by an extreme value, among extreme values having a high degree of correlation, corresponding to a position that is closest to the current focus lens position, and current position of the focus lens is within a specified range, if it is detected by the subject change detection section that the subject has changed, carries out a focus adjustment operation based on an extreme value, among extreme values having a high degree of correlation, corresponding to a position that is second closest to the current focus lens position.

3. The focus adjustment unit of claim 2, wherein the subject change detection section detects whether or not there has been change based on a contrast evaluation value that has been calculated based on the image data.

4. The focus adjustment unit of claim 2, wherein the subject change detection section determines whether or not there has been change based on numerical values of extreme values having a high degree of correlation, or a number of the extreme values, in the case where a periodicity-containing subject has been determined by the periodicity-containing subject determination section.

5. The focus adjustment unit of claim 2, wherein the subject change detection section detects whether or not there has been change based on edge components of the image data.

6. The focus adjustment unit of claim 2, wherein the control section, in the case where a difference between position of the focus lens represented by an extreme value, among extreme values having a high degree of correlation, corresponding to a position that is closest to the current focus lens position, and current position of the focus lens is within a specified range, if it is detected by the subject change detection section that the subject has changed, carries out a focus adjustment operation based on an extreme value, among extreme values having a high degree of correlation, corresponding to a position that is closest to the current focus lens position.

7. The focus adjustment unit of claim 2, further comprising:

a contrast evaluation value detection section for detecting contrast evaluation value based on the image data, wherein the control section, in the event that a periodicity-containing subject is determined again by the periodicity-containing subject detection section, after executing a focus adjustment operation based on an extreme value corresponding to a position closest to the current lens position, or an extreme value corresponding to a position that is second closest, determines change of the contrast evaluation value, and if the contrast evaluation value has decreased carries out a focus adjustment operation based on an extreme value corresponding to a position that is closest to the current focus lens position or an extreme value corresponding to reverse direction focus offset with respect to an extreme value corresponding to the second closest position to the current focus lens position.

8. The focus adjustment unit of claim 1, further comprising:

a contrast evaluation value detection section for detecting contrast evaluation value based on the image data, wherein the control section, in the event that a periodicity-containing subject is determined again by the periodicity-containing subject detection section, after executing a focus adjustment operation based on an extreme value corresponding to a position closest to the current lens position, or an extreme value corresponding to a position that is second closest, determines change of the contrast evaluation value, and if the contrast evaluation value has decreased carries out a focus adjustment operation based an extreme value corresponding to reverse direction focus offset with respect to an extreme value corresponding to a position that is closest to the current focus lens position.

9. The focus adjustment unit of claim 1, wherein:

the control section is capable of carrying out a scan operation to repeatedly acquire image data while moving the focus lens within a movable range between a close-up and an infinity end, and executing phase difference detection using the phase difference detection section, and the control section, in the event that a periodicity-containing subject has been determined after carrying out the scan operation, carries out a focus adjustment operation based on an extreme value corresponding to a position that is closest to the current focus lens position, among the plurality of extreme values having a high degree of correlation, where a corresponding focus lens position is positioned more towards the close-up end than a current position of the focus lens.

10. The focus adjustment unit of claim 9, wherein:

the control section, in the event that a periodicity-containing subject has been determined after moving the focus lens to the close-up end when carrying out a scan operation, carries out a focus adjustment operation based on an extreme value, for which a corresponding focus lens position is positioned more towards the infinity end than a current position of the focus lens, among a plurality of extreme values having a high degree of correlation, and which is the closest to the current focus lens position.

11. A focus adjustment method, for a focus adjustment unit having a photographing lens that includes a focus lens, for carrying out a focus adjustment operation based on image data that is generated by receiving light of a pupil divided subject image by means of the photographing lens and subjecting the received light to photoelectric conversion, comprising:

detecting extreme values having a high degree of correlation, based on the image data, determining a periodicity-containing subject in the case where many extreme values having a high degree of correlation have been detected, and when a periodicity-containing subject has been determined, determining whether or not a difference between a position of the focus lens represented by an extreme value corresponding to a position that is closest to a current focus lens position, among extreme values having a high degree of correlation, and the current focus lens position, is outside a specified range, and if it is determined that the difference is outside the specified range, carrying out a focus adjustment operation based on the extreme value corresponding to the position that is closest to the current position of the focus lens.

12. The focus adjustment method of claim 11, further comprising:

when a difference between a position of the focus lens represented by an extreme value corresponding to a position that is closest to a current focus lens position, among extreme values having a high degree of correlation, and the current focus lens position, is within a specified range, detecting whether or not a subject has changed from the subject at the time of previous focus, based on the image data, and if it has been detected that the subject has changed, carrying out a focus adjustment operation based on an extreme value corresponding to a position that is second closest to the current focus lens position, among the extreme values having a high degree of correlation.

13. The focus adjustment method of claim 12, further comprising:

detecting whether or not there has been change based on a contrast evaluation value that has been calculated based on the image data.

14. The focus adjustment method of claim 12, further comprising:

determining whether or not there has been change based on numerical values of extreme values having a high degree of correlation, or a number of the extreme values, in the case where a periodicity-containing subject has been determined.

15. The focus adjustment method of claim 12, further comprising:

detecting whether or not there has been change based on edge components of the image data.

16. The focus adjustment method of claim 12, further comprising:

when a difference between a position of the focus lens represented by an extreme value corresponding to a position that is closest to a current focus lens position, among extreme values having a high degree of correlation, and the current focus lens position, is within a specified range, detecting whether or not a subject has changed from the subject at the time of previous focus, based on the image data, and if it has been detected that the subject has not changed, carrying out a focus adjustment operation based on an extreme value corresponding to a position that is closest to the current focus lens position, among the extreme values having a high degree of correlation.

17. The focus adjustment method of claim 12, further comprising:

executing a focus adjustment operation based on an extreme value corresponding to a position that is closest to the current focus lens position, or an extreme value corresponding to the second closest position, if a periodicity-containing subject is determined again after execution of the focus adjustment operation, detecting contrast evaluation value based on the image data, and determining change in the contrast evaluation value, and if the contrast evaluation value has decreased, carrying out a focus adjustment operation based on an extreme value corresponding to reverse direction focus offset with respect to an extreme value corresponding to a position that is second closest to the current focus lens position.

18. The focus adjustment method of claim 11, further comprising:

executing a focus adjustment operation based on an extreme value corresponding to a position that is closest to the current focus lens position, or an extreme value corresponding to the second closest position, if a periodicity-containing subject is determined again after execution of the focus adjustment operation, detecting contrast evaluation value based on the image data, and determining change in the contrast evaluation value, and if the contrast evaluation value has decreased, carrying out a focus adjustment operation based on an extreme value corresponding to reverse direction focus offset with respect to an extreme value corresponding to a position that is closest to the current focus lens position.

19. The focus adjustment method of claim 11, wherein:

it is possible to carryout a scan operation to repeatedly acquire image data while moving the focus lens within a movable range between a close-up and an infinity end, and execute phase difference detection using a phase difference detection section, and in the event that a periodicity-containing subject has been determined after carrying out the scan operation, carrying out a focus adjustment operation based on an extreme value corresponding to a position that is closest to the current focus lens position, among the plurality of extreme values having a high degree of correlation, where a corresponding focus lens position is positioned more towards the close-up end than a current position of the focus lens.

20. The focus adjustment method of claim 19, wherein:

in the event that a periodicity-containing subject has been determined after moving the focus lens to the close-up end when carrying out a scan operation, carrying out a focus adjustment operation based on an extreme value corresponding to a position that is closest to the current focus lens position, among a plurality of extreme values having a high degree of correlation, where a corresponding focus lens position is positioned more towards the infinity end than a current position of the focus lens.

* * * * *